US011993008B2

(12) United States Patent
Hellestam

(10) Patent No.: US 11,993,008 B2
(45) Date of Patent: May 28, 2024

(54) METHOD AND APPARATUS FOR ADDITIVE MANUFACTURING

(71) Applicant: Arcam AB, Moelndal (SE)

(72) Inventor: Calle Hellestam, Goeteborg (SE)

(73) Assignee: ARCAM AB, Moelndal (SE)

(*) Notice: Subject to any disclaimer, the term of this patent is extended or adjusted under 35 U.S.C. 154(b) by 304 days.

(21) Appl. No.: 17/509,562

(22) Filed: Oct. 25, 2021

(65) Prior Publication Data

US 2022/0040766 A1 Feb. 10, 2022

Related U.S. Application Data

(62) Division of application No. 16/103,634, filed on Aug. 14, 2018, now Pat. No. 11,185,926.
(Continued)

(51) Int. Cl.
B29C 64/241 (2017.01)
B22F 3/10 (2006.01)
(Continued)

(52) U.S. Cl.
CPC .......... B29C 64/153 (2017.08); B22F 3/1017 (2013.01); B22F 10/28 (2021.01);
(Continued)

(58) Field of Classification Search
CPC .... B29C 64/214; B29C 64/218; B29C 64/241
See application file for complete search history.

(56) References Cited

U.S. PATENT DOCUMENTS 2,264,968 A 12/1941 De Forest
2,323,715 A 7/1943 Kuehni
(Continued)

FOREIGN PATENT DOCUMENTS

CA 2860188 A1 6/2006
CN 101607311 A 12/2009
(Continued)

OTHER PUBLICATIONS

Japanese Patent Application No. 2020-517525 Office Action, dated Mar. 9, 2021 (8 pages with English Translation).
(Continued)

Primary Examiner — Matthew J Daniels
(74) Attorney, Agent, or Firm — Dinsmore & Shohl LLP

(57) ABSTRACT

A method for forming at least one three-dimensional article through successive fusion of parts of a powder bed on a support structure, the method comprising the steps of: providing at least one model of the three-dimensional article, lowering the support structure a predetermined distance and rotating the support structure a predetermined angle in a first direction before applying a first powder layer covering the lowered and rotated support structure, rotating the support structure the predetermined angle in a second direction opposite to the first direction before directing the at least one first energy beam from the at least one first energy beam source at selected locations of the first powder layer, the at least one first energy beam source causing the first powder layer on the stationary support structure which is stationary to fuse in the selected locations according to the model to form first portions of the three-dimensional article.

6 Claims, 10 Drawing Sheets

Related U.S. Application Data

(60) Provisional application No. 62/565,596, filed on Sep. 29, 2017.

(51) Int. Cl.

| | | |
|---|---|---|
| *B22F 10/28* | (2021.01) | |
| *B22F 10/362* | (2021.01) | |
| *B22F 12/37* | (2021.01) | |
| *B23K 26/08* | (2014.01) | |
| *B29C 64/153* | (2017.01) | |
| *B29C 64/245* | (2017.01) | |
| *B33Y 10/00* | (2015.01) | |
| *B33Y 30/00* | (2015.01) | |
| *B33Y 50/02* | (2015.01) | |
| *B22F 10/32* | (2021.01) | |
| *B22F 10/36* | (2021.01) | |
| *B22F 12/13* | (2021.01) | |
| *B22F 12/52* | (2021.01) | |
| *B22F 12/55* | (2021.01) | |
| *B22F 12/90* | (2021.01) | |

(52) U.S. Cl.
CPC ............ *B22F 10/362* (2021.01); *B22F 12/37* (2021.01); *B23K 26/0823* (2013.01); *B23K 26/083* (2013.01); *B29C 64/241* (2017.08); *B29C 64/245* (2017.08); *B33Y 10/00* (2014.12); *B33Y 30/00* (2014.12); *B33Y 50/02* (2014.12); *B22F 10/32* (2021.01); *B22F 10/36* (2021.01); *B22F 12/13* (2021.01); *B22F 12/52* (2021.01); *B22F 12/55* (2021.01); *B22F 12/90* (2021.01)

(56) References Cited

U.S. PATENT DOCUMENTS

| | | |
|---|---|---|
| 3,634,644 A | 1/1972 | Ogden et al. |
| 3,838,496 A | 10/1974 | Kelly |
| 3,882,477 A | 5/1975 | Mueller |
| 3,906,229 A | 9/1975 | Demeester et al. |
| 3,908,124 A | 9/1975 | Rose |
| 4,314,134 A | 2/1982 | Schumacher et al. |
| 4,348,576 A | 9/1982 | Anderl et al. |
| 4,352,565 A | 10/1982 | Rowe et al. |
| 4,401,719 A | 8/1983 | Kobayashi et al. |
| 4,541,055 A | 9/1985 | Wolfe et al. |
| 4,651,002 A | 3/1987 | Anno |
| 4,818,562 A | 4/1989 | Arcekkam et al. |
| 4,863,538 A | 9/1989 | Deckard |
| 4,888,490 A | 12/1989 | Bass et al. |
| 4,927,992 A | 5/1990 | Whitlow et al. |
| 4,958,431 A | 9/1990 | Clark et al. |
| 4,988,844 A | 1/1991 | Dietrich et al. |
| 5,118,192 A | 6/1992 | Chen et al. |
| 5,135,695 A | 8/1992 | Marcus |
| 5,167,989 A | 12/1992 | Dudek et al. |
| 5,182,170 A | 1/1993 | Marcus et al. |
| 5,204,055 A | 4/1993 | Sachs et al. |
| 5,247,560 A | 9/1993 | Hosokawa et al. |
| 5,393,482 A | 2/1995 | Benda et al. |
| 5,483,036 A | 1/1996 | Giedt et al. |
| 5,508,489 A | 4/1996 | Benda et al. |
| 5,511,103 A | 4/1996 | Hasegawa |
| 5,595,670 A | 1/1997 | Mombo |
| 5,647,931 A | 7/1997 | Retallick et al. |
| 5,753,274 A | 5/1998 | Wilkening et al. |
| 5,837,960 A | 11/1998 | Lewis et al. |
| 5,876,550 A | 3/1999 | Feygin et al. |
| 5,904,890 A | 5/1999 | Lohner et al. |
| 5,932,290 A | 8/1999 | Lombardi et al. |
| 6,046,426 A | 4/2000 | Jeantette et al. |
| 6,162,378 A | 12/2000 | Bedal et al. |
| 6,204,469 B1 | 3/2001 | Fields et al. |
| 6,419,203 B1 | 7/2002 | Dang |
| 6,537,052 B1 | 3/2003 | Adler |
| 6,554,600 B1 | 4/2003 | Hofmann et al. |
| 6,583,379 B1 | 6/2003 | Meiners et al. |
| 6,676,892 B2 | 1/2004 | Das et al. |
| 6,724,001 B1 | 4/2004 | Pinckney et al. |
| 6,746,506 B2 | 6/2004 | Liu et al. |
| 6,751,516 B1 | 6/2004 | Richardson |
| 6,764,636 B1 | 7/2004 | Allanic et al. |
| 6,811,744 B2 | 11/2004 | Keicher et al. |
| 6,815,636 B2 | 11/2004 | Chung et al. |
| 6,824,714 B1 | 11/2004 | Türck et al. |
| 7,003,864 B2 | 2/2006 | Dirscherl |
| 7,020,539 B1 | 3/2006 | Kovacevic et al. |
| 7,165,498 B2 | 1/2007 | Mackrill et al. |
| 7,204,684 B2 | 4/2007 | Ederer et al. |
| 7,291,002 B2 | 11/2007 | Russell et al. |
| 7,452,500 B2 | 11/2008 | Uckelmann |
| 7,454,262 B2 | 11/2008 | Larsson et al. |
| 7,537,722 B2 | 5/2009 | Andersson et al. |
| 7,540,738 B2 | 6/2009 | Larsson et al. |
| 7,569,174 B2 | 8/2009 | Ruatta et al. |
| 7,635,825 B2 | 12/2009 | Larsson |
| 7,686,605 B2 | 3/2010 | Perret et al. |
| 7,696,501 B2 | 4/2010 | Jones |
| 7,713,454 B2 | 5/2010 | Larsson |
| 7,754,135 B2 | 7/2010 | Abe et al. |
| 7,799,253 B2 | 9/2010 | Höchsmann et al. |
| 7,871,551 B2 | 1/2011 | Wallgren et al. |
| 8,021,138 B2 | 9/2011 | Green |
| 8,083,513 B2 | 12/2011 | Montero-Escuder et al. |
| 8,137,739 B2 | 3/2012 | Philippi et al. |
| 8,187,521 B2 | 5/2012 | Larsson et al. |
| 8,308,466 B2 | 11/2012 | Ackelid et al. |
| 8,992,813 B2 | 3/2015 | Jonasson et al. |
| 9,073,265 B2 | 7/2015 | Snis |
| 9,079,248 B2 | 7/2015 | Ackelid |
| 9,126,167 B2 | 9/2015 | Ljungblad |
| 9,254,535 B2 | 2/2016 | Buller et al. |
| 9,310,188 B2 | 4/2016 | Snis |
| 9,505,172 B2 | 11/2016 | Ljungblad |
| 9,550,207 B2 | 1/2017 | Ackelid |
| 9,802,253 B2 | 10/2017 | Jonasson |
| 9,950,367 B2 | 4/2018 | Backlund et al. |
| 10,071,422 B2 | 9/2018 | Buller et al. |
| 2002/0104973 A1 | 8/2002 | Kerekes |
| 2002/0152002 A1 | 10/2002 | Lindemann et al. |
| 2002/0195747 A1 | 12/2002 | Hull et al. |
| 2003/0043360 A1 | 3/2003 | Farnworth |
| 2003/0133822 A1 | 7/2003 | Harryson |
| 2003/0205851 A1 | 11/2003 | Laschutza et al. |
| 2004/0012124 A1 | 1/2004 | Li et al. |
| 2004/0026807 A1 | 2/2004 | Andersson et al. |
| 2004/0084814 A1 | 5/2004 | Boyd et al. |
| 2004/0104499 A1 | 6/2004 | Keller |
| 2004/0148048 A1 | 7/2004 | Farnworth |
| 2004/0173496 A1 | 9/2004 | Srinivasan |
| 2004/0173946 A1 | 9/2004 | Pfeifer et al. |
| 2004/0204765 A1 | 10/2004 | Fenning et al. |
| 2004/0217095 A1 | 11/2004 | Herzog |
| 2004/0265413 A1* | 12/2004 | Russell .................. B41J 29/17 425/375 |
| 2005/0173380 A1 | 8/2005 | Carbone |
| 2005/0186538 A1 | 8/2005 | Uckelmann |
| 2005/0282300 A1 | 12/2005 | Yun et al. |
| 2006/0108712 A1 | 5/2006 | Mattes |
| 2006/0138325 A1 | 6/2006 | Choi |
| 2006/0145381 A1 | 7/2006 | Larsson |
| 2006/0147332 A1 | 7/2006 | Jones et al. |
| 2006/0157892 A1 | 7/2006 | Larsson |
| 2006/0180957 A1 | 8/2006 | Hopkinson et al. |
| 2006/0284088 A1 | 12/2006 | Fukunaga et al. |
| 2007/0074659 A1 | 4/2007 | Wahlstrom |
| 2007/0175875 A1 | 8/2007 | Uckelmann et al. |
| 2007/0179655 A1 | 8/2007 | Farnworth |
| 2007/0182289 A1 | 8/2007 | Kigawa et al. |
| 2007/0298182 A1 | 12/2007 | Perret et al. |
| 2008/0236738 A1 | 10/2008 | Lo et al. |
| 2009/0017219 A1 | 1/2009 | Paasche et al. |

(56) References Cited

U.S. PATENT DOCUMENTS

| | | |
|---|---|---|
| 2009/0152771 A1 | 6/2009 | Philippi et al. |
| 2009/0206056 A1 | 8/2009 | Xu et al. |
| 2010/0007062 A1 | 1/2010 | Larsson et al. |
| 2010/0260410 A1 | 10/2010 | Taminger et al. |
| 2010/0305743 A1 | 12/2010 | Larsson |
| 2010/0310404 A1 | 12/2010 | Ackelid |
| 2010/0331685 A1 | 12/2010 | Currie et al. |
| 2011/0061591 A1 | 3/2011 | Stecker |
| 2011/0114839 A1 | 5/2011 | Stecker et al. |
| 2011/0133367 A1 | 6/2011 | Weidinger et al. |
| 2011/0240607 A1 | 10/2011 | Stecker et al. |
| 2011/0241575 A1 | 10/2011 | Ciafa et al. |
| 2011/0293770 A1 | 12/2011 | Ackelid et al. |
| 2011/0293771 A1 | 12/2011 | Oberhofer et al. |
| 2011/0297081 A1 | 12/2011 | Green |
| 2011/0309554 A1 | 12/2011 | Liska et al. |
| 2011/0316178 A1 | 12/2011 | Uckelmann |
| 2012/0100031 A1 | 4/2012 | Ljungblad |
| 2012/0164322 A1 | 6/2012 | Teulet et al. |
| 2012/0183701 A1 | 7/2012 | Pilz et al. |
| 2012/0193530 A1 | 8/2012 | Parker et al. |
| 2012/0211155 A1 | 8/2012 | Wehning et al. |
| 2012/0223059 A1 | 9/2012 | Ackelid |
| 2012/0225210 A1 | 9/2012 | Fruth |
| 2012/0237745 A1 | 9/2012 | Dierkes et al. |
| 2012/0266815 A1 | 10/2012 | Brundermer |
| 2013/0055568 A1 | 3/2013 | Dusel et al. |
| 2013/0162134 A1 | 6/2013 | Mattausch et al. |
| 2013/0186514 A1 | 7/2013 | Zhuang et al. |
| 2013/0216959 A1 | 8/2013 | Tanaka et al. |
| 2013/0233846 A1 | 9/2013 | Jakimov et al. |
| 2013/0264750 A1 | 10/2013 | Hofacker et al. |
| 2013/0270750 A1 | 10/2013 | Green |
| 2013/0278920 A1 | 10/2013 | Loewgren |
| 2013/0300286 A1 | 11/2013 | Ljungblad et al. |
| 2013/0343947 A1 | 12/2013 | Satzger et al. |
| 2014/0175708 A1 | 6/2014 | Echigo et al. |
| 2014/0263209 A1 | 9/2014 | Burrs et al. |
| 2014/0271964 A1 | 9/2014 | Roberts, IV et al. |
| 2014/0301884 A1 | 10/2014 | Hellestam et al. |
| 2014/0308153 A1 | 10/2014 | Ljungblad |
| 2014/0314609 A1 | 10/2014 | Ljungblad et al. |
| 2014/0314964 A1 | 10/2014 | Ackelid |
| 2014/0348691 A1 | 11/2014 | Ljungblad et al. |
| 2014/0363327 A1 | 12/2014 | Holcomb |
| 2014/0367367 A1 | 12/2014 | Wood et al. |
| 2015/0004045 A1 | 1/2015 | Ljungblad |
| 2015/0050463 A1 | 2/2015 | Nakano et al. |
| 2015/0071809 A1 | 3/2015 | Nordkvist et al. |
| 2015/0086409 A1 | 3/2015 | Hellestam |
| 2015/0088295 A1 | 3/2015 | Hellestam |
| 2015/0130118 A1 | 5/2015 | Cheng et al. |
| 2015/0139849 A1 | 5/2015 | Pialot, Jr. et al. |
| 2015/0151490 A1 | 6/2015 | Jonasson et al. |
| 2015/0165524 A1 | 6/2015 | Ljungblad et al. |
| 2015/0165525 A1 | 6/2015 | Jonasson |
| 2015/0174658 A1 | 6/2015 | Ljungblad |
| 2015/0174695 A1 | 6/2015 | Elfstroem et al. |
| 2015/0251249 A1 | 9/2015 | Fager |
| 2015/0273622 A1 | 10/2015 | Manabe |
| 2015/0283610 A1 | 10/2015 | Ljungblad et al. |
| 2015/0283613 A1 | 10/2015 | Backlund et al. |
| 2015/0290710 A1 | 10/2015 | Ackelid |
| 2015/0306819 A1 | 10/2015 | Ljungblad |
| 2016/0052056 A1 | 2/2016 | Fager |
| 2016/0052079 A1 | 2/2016 | Ackelid |
| 2016/0054115 A1 | 2/2016 | Snis |
| 2016/0054121 A1 | 2/2016 | Snis |
| 2016/0054347 A1 | 2/2016 | Snis |
| 2016/0059314 A1 | 3/2016 | Ljungblad et al. |
| 2016/0129501 A1 | 5/2016 | Loewgren et al. |
| 2016/0167160 A1 | 6/2016 | Hellestam |
| 2016/0167303 A1 | 6/2016 | Petelet |
| 2016/0202042 A1 | 7/2016 | Snis |
| 2016/0202043 A1 | 7/2016 | Snis |
| 2016/0211116 A1 | 7/2016 | Lock |
| 2016/0236279 A1 | 8/2016 | Ashton et al. |
| 2016/0279735 A1 | 9/2016 | Hellestam |
| 2016/0282848 A1 | 9/2016 | Hellestam |
| 2016/0303687 A1 | 10/2016 | Ljungblad |
| 2016/0307731 A1 | 10/2016 | Lock |
| 2016/0311021 A1 | 10/2016 | Elfstroem |
| 2017/0080494 A1 | 3/2017 | Ackelid |
| 2017/0087661 A1 | 3/2017 | Backlund et al. |
| 2017/0106443 A1 | 4/2017 | Karlsson |
| 2017/0106570 A1 | 4/2017 | Karlsson |
| 2017/0136541 A1 | 5/2017 | Fager |
| 2017/0136542 A1 | 5/2017 | Nordkvist et al. |
| 2017/0173691 A1 | 6/2017 | Jonasson |
| 2017/0189964 A1 | 7/2017 | Backlund et al. |
| 2017/0227417 A1 | 8/2017 | Snis |
| 2017/0227418 A1 | 8/2017 | Snis |
| 2017/0246684 A1 | 8/2017 | Hellestam |
| 2017/0246685 A1 | 8/2017 | Hellestam |
| 2017/0259338 A1 | 9/2017 | Ackelid |
| 2017/0282248 A1 | 10/2017 | Ljungblad et al. |
| 2017/0294288 A1 | 10/2017 | Lock |
| 2017/0341141 A1 | 11/2017 | Ackelid |
| 2017/0341142 A1 | 11/2017 | Ackelid |
| 2017/0348791 A1 | 12/2017 | Eckberg |
| 2017/0348792 A1 | 12/2017 | Fager |
| 2018/0009033 A1 | 1/2018 | Fager |
| 2018/0154444 A1 | 6/2018 | Jonasson |
| 2019/0299283 A1* | 10/2019 | Sheinman ............... B22F 10/14 |

FOREIGN PATENT DOCUMENTS

| | | | |
|---|---|---|---|
| CN | 101635210 A | 1/2010 | |
| CN | 201693176 U | 1/2011 | |
| CN | 101607311 B | 9/2011 | |
| CN | 203509463 U | 4/2014 | |
| CN | 103786342 A | 5/2014 | |
| CN | 103909263 A | 7/2014 | |
| CN | 104890238 A | 9/2015 | |
| DE | 19952998 A1 | 5/2001 | |
| DE | 20305843 U1 | 7/2003 | |
| DE | 10235434 A1 | 2/2004 | |
| DE | 102005014483 A1 | 10/2006 | |
| DE | 202008005417 U1 | 8/2008 | |
| DE | 102007018601 A1 | 10/2008 | |
| DE | 102007029052 A1 | 1/2009 | |
| DE | 102008012064 A1 | 9/2009 | |
| DE | 102010041284 A1 | 3/2012 | |
| DE | 102011105045 B3 | 6/2012 | |
| DE | 102013210242 A1 | 12/2014 | |
| DE | 102014004633 A1 * | 10/2015 | ............... B22F 10/28 |
| EP | 0289116 A1 | 11/1988 | |
| EP | 0322257 A2 | 6/1989 | |
| EP | 0688262 A1 | 12/1995 | |
| EP | 1358994 A1 | 11/2003 | |
| EP | 1418013 A1 | 5/2004 | |
| EP | 1466718 A2 | 10/2004 | |
| EP | 1486318 A2 | 12/2004 | |
| EP | 1669143 A1 | 6/2006 | |
| EP | 1683593 A2 | 7/2006 | |
| EP | 17217725 A1 | 11/2006 | |
| EP | 1752240 A1 | 2/2007 | |
| EP | 1952932 A2 | 8/2008 | |
| EP | 2011631 A1 | 1/2009 | |
| EP | 2119530 A1 | 11/2009 | |
| EP | 2281677 A1 | 2/2011 | |
| EP | 2289652 A1 | 3/2011 | |
| EP | 2292357 A1 | 3/2011 | |
| EP | 2832474 A1 | 2/2015 | |
| FR | 2980380 A1 | 3/2013 | |
| JP | H05-171423 A | 7/1993 | |
| JP | 2003241394 A | 8/2003 | |
| JP | 2003245981 | 9/2003 | |
| JP | 2008540173 A | 11/2008 | |
| JP | 2009006509 A | 1/2009 | |
| JP | 4404947 B1 | 1/2010 | |
| JP | 2010228332 A | 10/2010 | |
| JP | 2017013426 A2 | 1/2017 | |
| SE | 524467 C2 | 8/2004 | |

(56) References Cited

FOREIGN PATENT DOCUMENTS

| | | |
|---|---|---|
| WO | 199308928 A1 | 5/1993 |
| WO | 1996012607 A1 | 5/1996 |
| WO | 199737523 A2 | 10/1997 |
| WO | 200185386 A2 | 11/2001 |
| WO | 2001081031 A1 | 11/2001 |
| WO | 2002008653 A1 | 1/2002 |
| WO | 2004007124 A1 | 1/2004 |
| WO | 2004043680 A2 | 5/2004 |
| WO | 2004054743 A1 | 7/2004 |
| WO | 2004056511 A1 | 7/2004 |
| WO | 2004106041 A2 | 12/2004 |
| WO | 2004108398 A1 | 12/2004 |
| WO | 2006091097 A2 | 8/2006 |
| WO | 2006121374 A1 | 11/2006 |
| WO | 2007112808 A1 | 10/2007 |
| WO | 2007147221 A1 | 12/2007 |
| WO | 2008013483 A1 | 1/2008 |
| WO | 2008057844 A1 | 5/2008 |
| WO | 2008074287 A1 | 6/2008 |
| WO | 2008125497 A1 | 10/2008 |
| WO | 2008147306 A1 | 12/2008 |
| WO | 2009000360 A1 | 12/2008 |
| WO | 2009072935 A1 | 6/2009 |
| WO | 2009084991 A1 | 7/2009 |
| WO | 2010095987 A1 | 8/2010 |
| WO | 2010125371 A1 | 11/2010 |
| WO | 2011008143 A1 | 1/2011 |
| WO | 2011011818 A1 | 2/2011 |
| WO | 2011030017 A1 | 3/2011 |
| WO | 2011060312 A2 | 5/2011 |
| WO | 2012102655 A1 | 8/2012 |
| WO | 2013092997 A1 | 6/2013 |
| WO | 2013098050 A1 | 7/2013 |
| WO | 2013098135 A1 | 7/2013 |
| WO | 2013159811 A1 | 10/2013 |
| WO | 2013167194 A1 | 11/2013 |
| WO | 2013178825 A2 | 12/2013 |
| WO | 2014071968 A1 | 5/2014 |
| WO | 2014092651 A1 | 6/2014 |
| WO | 2014095200 A1 | 6/2014 |
| WO | 2014095208 A1 | 6/2014 |
| WO | 2014195068 A1 | 12/2014 |
| WO | 2015032590 A2 | 3/2015 |
| WO | 2015091813 A1 | 6/2015 |
| WO | 2015120168 A1 | 8/2015 |
| WO | 2015142492 A1 | 9/2015 |
| WO | 2016096433 A1 | 6/2016 |
| WO | 2016096438 A1 | 6/2016 |

OTHER PUBLICATIONS

Japanese Patent Application No. 2020-517514 Office Action, dated Mar. 9, 2021 (10 pages with English Translation).

European Office Action relating to European Application No. 18774034.5 dated Mar. 3, 2021.

International Search Report and Written Opinion for application PCT/EP2018/075745 dated Oct. 31, 2018 (15 pages).

International Search Report and Written Opinion for application PCT/EP2018/075740 dated Oct. 31, 2018 (13 pages).

Cheah, Chi-Mun, et al., "Automatic Algorithm for Generating Complex Polyhedral Scaffold Structure for Tissue Engineering", Tissue Engineering 2004, pp. 595-610, vol. 10, No. 3/4, XP002691483.

Gibson, D.W., et al., "Additive Manufacturing Technologies Rapid Prototyping to Direct Digital Manufacturing", 2010, pp. 126-129, Springer, New York.

Guibas, Leonidas J., et al., "Randomized Incremental Construction of Delaunay and Voronoi Diagrams", Algorithmica, Jun. 1992, pp. 381-413 vol. 7, Issue 1-6, Springer-Verlag, New York.

Klassen, Alexander, et al., "Modelling of Electron Beam Absorption in Complex Geometrics", Journal of Physics D: Applied Physics, Jan. 15, 2014, 12 pages, vol. 47, No. 6, Institute Of Physicis Publishing Ltd., Great Britain.

Motojima, Seiji, et al., "Chemical Vapor Growth of LaB6 Whiskers And Crystals Having A Sharp Tip", Journal Of Crystal Growth, vol. 44, No. 1, Aug. 1, 1978 (Aug. 1, 1978), pp. 106-109.

Weigel, TH., et al., "Design And Preparation of Polymeric Scaffolds For Tissue Engineering," Expert Rev. Mcd. Devices, 2006, pp. 835-851, vol. 3, No. 6, XP002691485.

Yang, et al., "The Design of Scaffolds for Use in Tissue Engineering, Part II, Rapid Prototyping Techniques", Tissue Engineering, 2002, pp. 1-11, vol. 8, No. 1, XP002691484.

First Office Action for China Application No. 201880063072.7 dated Oct. 29, 2021.

\* cited by examiner

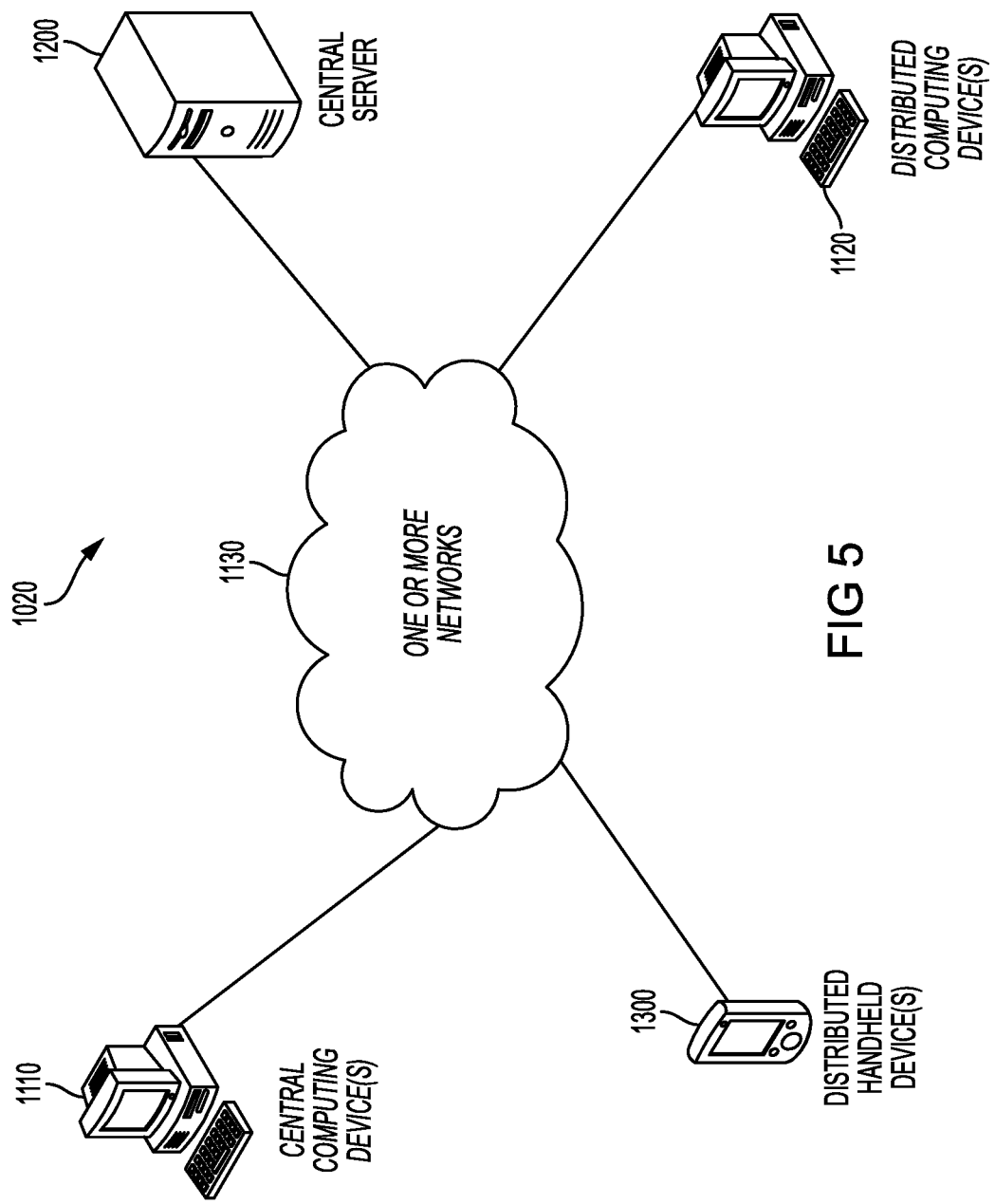

METHOD AND APPARATUS FOR ADDITIVE MANUFACTURING

CROSS REFERENCE TO RELATED APPLICATIONS

This application is a divisional of U.S. Non-Provisional application Ser. No. 16/103,634, filed on Aug. 14, 2018, which claims the benefit of U.S. Provisional Patent Application No. 62/565,596, filed on Sep. 29, 2017, the contents of which are hereby incorporated by reference in their entirety.

BACKGROUND

Technical Field

The present invention relates to a method and apparatus for additive manufacturing of 3-dimensional objects.

Related Art

Freeform fabrication or additive manufacturing is a method for forming three-dimensional articles through successive fusion of chosen parts of powder layers applied to a work plate.

Such an apparatus may comprise a work plate on which the three-dimensional article is to be formed, a powder dispenser, arranged to lay down a thin layer of powder on the work plate for the formation of a powder bed, a laser beam source for delivering energy to the powder whereby fusion of the powder takes place, elements for control of the laser beam source over the powder bed for the formation of a cross section of the three-dimensional article through fusion of parts of the powder bed, and a controlling computer, in which information is stored concerning consecutive cross sections of the three-dimensional article. A three-dimensional article is formed through consecutive fusions of consecutively formed cross sections of powder layers, successively laid down by the powder dispenser.

FIG. 1 illustrates schematically an additive manufacturing apparatus comprising a laser source 1 directed by scanning optics 2 such that the beam 3 defines a 2-dimensional pattern in a thin bed of metal powder 4. Where the laser impinges upon the bed of powder, the powder is fused to form a solid layer 5 bonded to a base plate 6. When the first layer is completed, the build plate is indexed down by the elevator mechanism 7. The powder bed is then replenished to the original level by the powder distributor 8 which scans horizontally so as to scrape powder from powder supply hopper 9 and deposit a uniform layer above the previously scanned layer. The second layer of powder is then scanned so as to fuse the required areas of powder onto the previously fused layer 5. By repeating this process, a 3-dimensional article is progressively build up, being composed of multiple 2-dimensional layers 5.

A problem with the prior art is the difficulty of providing a layer of metal powder with equal thickness over the full build envelope. A variation of the powder layer thickness may be revealed by dimensional inaccuracy of the final product.

There is a demand for additive manufacturing techniques with higher machine yield, higher final quality of manufactured part and a less sensitive powder dispatching system.

BRIEF SUMMARY

An object of the present invention is to provide an additive manufacturing apparatus and method suitable for additive manufacturing of three-dimensional parts which is capable of efficiently building higher quality parts than prior art machines without sacrificing material properties of the final product.

In a first aspect according to various embodiments of the invention it is provided a method for forming at least one three-dimensional article through successive fusion of parts of a powder bed on a support structure, which parts correspond to successive portions of the three-dimensional article, the method comprising the steps of: providing at least one model of the three-dimensional article, lowering the support structure a predetermined distance and rotating the support structure a predetermined angle in a first direction before applying a first powder layer covering the lowered and rotated support structure, rotating the support structure the predetermined angle in a second direction opposite to the first direction before directing the at least one first energy beam from the at least one first energy beam source at selected locations for fusing the first powder layer, directing the at least one first energy beam from the at least one first energy beam source at selected locations according to the model for fusing the first powder layer on the support structure, which is stationary, for forming first portions of the three-dimensional article, repeating the steps of lowering and rotating until the three-dimensional article is finished.

An exemplary advantage of at least these embodiments is that additive manufacturing may be performed with higher yield. This is due to the fact that the angle of the manufactured part(s) relative to the powder distributor is not constant but changed from one layer to another. This will help removing repetitive errors that may arise when using a static angle between the parts that is to be manufactured and the powder distributor. By changing the angle of the powder distribution mechanism and the support structure onto which the three-dimensional article is manufactured may also remove errors in the powder distribution process independently of what is manufactured, i.e., powder distribution errors are distributed more evenly over the manufacturing area compared to when using a fixed angle of the powder distribution process and support structure. In the latter case, errors may be stacked onto each other from one layer to another, which in the end may cause not only dimension errors but also reduced mechanical properties of the final article.

In various example embodiments according to the present invention the predetermined angle which the support structure is rotated is equal or unequal from one layer to another.

An exemplary advantage of using unequal rotational angle from one layer to another is that errors emanating from the powder distribution process is spread out at a larger area where they have no impact on the final article or eliminated due to the fact that the angle between the powder distributor and the previously built three-dimensional layer will not cause any powder layer inhomogeneities. An exemplary advantage of using an equal rotational angle for a predetermined number of layers is that the angle is known beforehand not to cause any powder layer inhomogeneities for the-three dimensional cross sections which is to be built. Another fixed rotational angle may be used for a predetermined number of layers if the other rotational angle gives a better powder layer homogeneity than the previously used rotational angle. A more favourable rotational angle may arise if the cross sections which has been built is altered.

In various example embodiments according to the present invention the support structure is rotated by rotating the support structure alone and/or a build tank in which the support structure is arranged.

An exemplary advantage of rotating the support structure alone and keeping the position of the build tank fixed is that it reduces the mechanical complexity of the machine. An exemplary advantage of rotating the build tank is that it may reduce the leakage of powder between the support structure and the build tank.

An advantage of various example embodiments of the present invention is that any type of powder distribution process may be used. The rotation of the support structure a predetermined angle before powder application and then reposition to the original position before fusion takes place may reduce powder distribution related errors irrespective of how the powder distribution is made.

In a second aspect according to various embodiments of the invention it is provided an apparatus for forming a three-dimensional article through successive fusion of parts of a powder bed, which parts corresponds to successive cross sections of the three-dimensional article, the apparatus comprising: a. a control unit having stored thereon a computer model of the three-dimensional article, b. a control unit configured for moving a support structure a predetermined distance in z-direction and rotating the support structure a predetermined angle in a first direction before applying a first powder layer covering the lowered and rotated support structure, c. a control unit configured for rotating the support structure the predetermined angle in a second direction opposite to the first direction before directing the at least one first energy beam from the at least one first energy beam source at selected locations for fusing the first powder layer, d. a control unit configured for directing the at least one first energy beam from the at least one first energy beam source at selected locations according to the model for fusing the first powder layer on the support structure, which is stationary, for forming first portions of the three-dimensional article, and e. a control unit configured for repeating step b-d until the three-dimensional article is finished.

An exemplary advantage of at least these embodiments is that it provides for an additive manufacturing apparatus with higher yield. This is due to the fact that the angle of the manufactured part(s) relative to the powder distributor is not constant but changed from one layer to another. This will help removing repetitive errors that may arise when using a static angle between the parts that is to be manufactured and the powder distributor. By changing the angle of the powder distribution mechanism and the support structure onto which the three-dimensional article is manufactured may also remove errors in the powder distribution process independently of what is manufactured, i.e., powder distribution errors are distributed more evenly over the manufacturing area compared to when using a fixed angle of the powder distribution process and support structure. In the latter case, errors may be stacked onto each other from one layer to another, which in the end may cause not only dimension errors but also reduced mechanical properties of the final article.

Another exemplary advantage of these embodiments is that it is equally applicable for any powder distribution mechanism and they are also independent of the energy beam source used for fusing the powder material.

In yet another aspect according to various embodiments of the invention it is provided a method for forming at least one three-dimensional article through successive fusion of parts of a powder bed on a support structure, which parts correspond to successive portions of the three-dimensional article. The method comprises the steps of: providing at least one model of the three-dimensional article, lowering the support structure a predetermined distance and rotating the support structure a predetermined angle in a first direction before applying a first powder layer covering the lowered and rotated support structure, rotating the at least one model by the predetermined angle in the first direction before directing the at least one first energy beam from the at least one first energy beam source at selected locations for fusing the first powder layer, directing the at least one first energy beam from the at least one first energy beam source at selected locations according to the model for fusing the first powder layer on the support structure, which is stationary, for forming first portions of the three-dimensional article, and repeating at least the lowering and the rotating steps until the three-dimensional article is finished. Exemplary advantages of this method mirror those previously detailed herein, although the same are achievable with a single mechanical rotation versus two.

In yet another aspect according to various embodiments of the invention it is provided a computer program product comprising at least one non-transitory computer-readable storage medium having computer-readable program code portions embodied therein, the computer-readable program code portions comprising one or more executable portions configured for: upon receipt of at least one model of a three-dimensional article, lowering a support structure a predetermined distance and rotating the support structure a predetermined angle in a first direction before applying a first powder layer covering the lowered and rotated support structure, rotating the at least one model by the predetermined angle in the first direction before directing the at least one first energy beam from the at least one first energy beam source at selected locations for fusing the first powder layer, directing the at least one first energy beam from the at least one first energy beam source at selected locations according to the model for fusing the first powder layer on the support structure, which is stationary, for forming first portions of the three-dimensional article, and repeating the lowering, rotating, and directing steps until the three-dimensional article is finished. Exemplary advantages of this computer program product mirror those of the method summarized immediately above.

In yet another aspect according to various embodiments of the invention it is provided an apparatus for forming a three-dimensional article through successive fusion of parts of a powder bed, which parts corresponds to successive cross sections of the three-dimensional article, the apparatus comprising: a selectively rotatable support structure; at least one first energy beam; at least one control unit with a computer model of the three-dimensional article stored thereon, the control unit being configured for: moving the support structure a predetermined distance in z-direction and rotating the support structure a predetermined angle in a first direction before applying a first powder layer covering the lowered and rotated support structure, rotating the computer model by the predetermined angle in the first direction before directing the at least one first energy beam from the at least one first energy beam source at selected locations for fusing the first powder layer, directing the at least one first energy beam from the at least one first energy beam source at selected locations according to the model for fusing the first powder layer on the support structure, which is stationary, for forming first portions of the three-dimensional article, and repeating the moving, rotating, and directing steps until the three-dimensional article is finished. Exemplary advantages of this apparatus mirror those of the method summarized immediately above.

Herein and throughout, where an exemplary embodiment is described or an advantage thereof is identified, such are considered and intended as exemplary and non-limiting in nature, so as to not otherwise limit or constrain the scope and nature of the inventive concepts disclosed.

BRIEF DESCRIPTION OF THE SEVERAL VIEWS OF THE DRAWING(S)

The invention will be further described in the following, in a non-limiting way with reference to the accompanying drawings. Same characters of reference are employed to indicate corresponding similar parts throughout the several figures of the drawings:

FIG. 1 presents a first schematic side view of an additive manufacturing apparatus according to prior art;

FIG. 2 presents a second schematic side view of an additive manufacturing apparatus according to prior art;

FIGS. 3A-3D show respective side views of an additive manufacturing machine in different manufacturing stages according to certain embodiments of the present invention;

FIGS. 3E-G show respective side views of an additive manufacturing machine in different manufacturing stages according to certain additional embodiments of the present invention;

FIGS. 4A-B show exemplary schematic flow charts according to various embodiments of the present invention;

FIG. 5 is a block diagram of an exemplary system 1020 according to various embodiments;

DETAILED DESCRIPTION OF VARIOUS EMBODIMENTS

Figure 1:
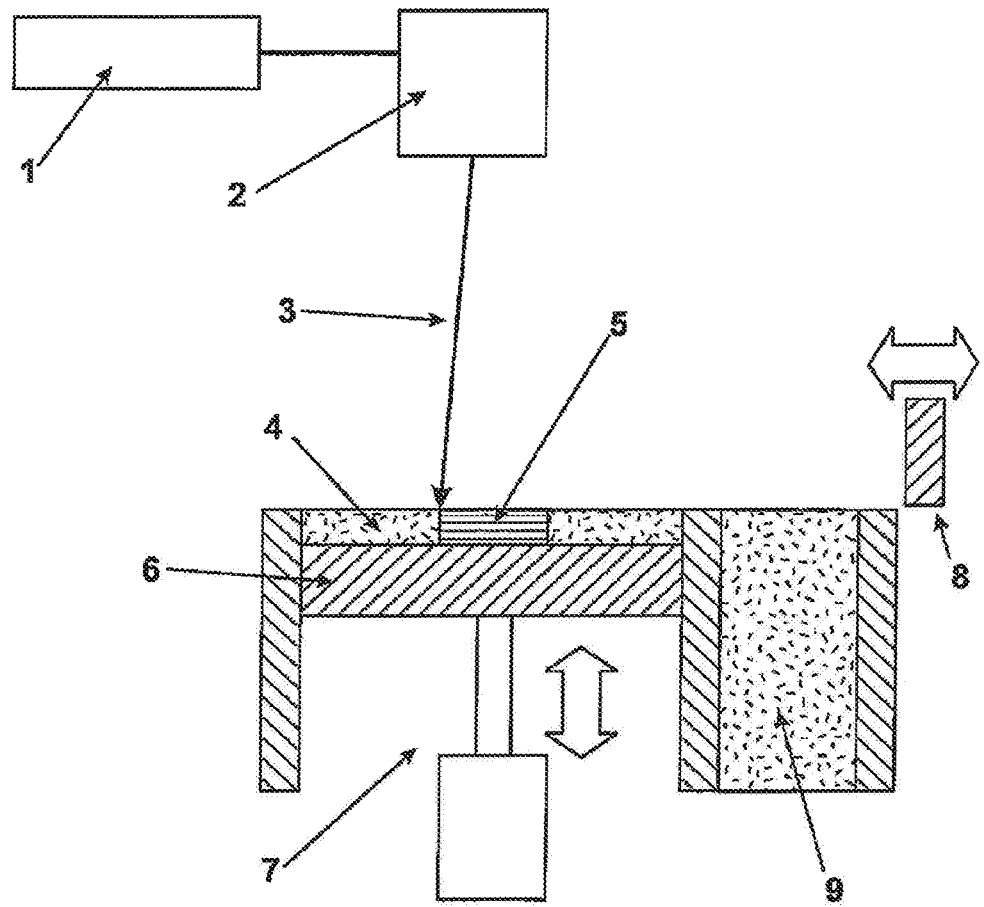

Various example embodiments of the present invention will now be described more fully hereinafter with reference to the accompanying drawings, in which some, but not all embodiments of the invention are shown. Indeed, embodiments of the invention may be embodied in many different forms and should not be construed as limited to the embodiments set forth herein. Rather, these embodiments are provided so that this disclosure will satisfy applicable legal requirements. Unless otherwise defined, all technical and scientific terms used herein have the same meaning as commonly known and understood by one of ordinary skill in the art to which the invention relates. The term "or" is used herein in both the alternative and conjunctive sense, unless otherwise indicated. Like numbers refer to like elements throughout.

To facilitate the understanding of this invention, a number of terms are defined below. Terms defined herein have meanings as commonly understood by a person of ordinary skill in the areas relevant to the present invention. Terms such as "a", "an" and "the" are not intended to refer to only a singular entity, but include the general class of which a specific example may be used for illustration. The terminology herein is used to describe specific embodiments of the invention, but their usage does not delimit the invention, except as outlined in the claims.

The term "three-dimensional structures" and the like as used herein refer generally to intended or actually fabricated three-dimensional configurations (e.g. of structural material or materials) that are intended to be used for a particular purpose. Such structures, etc. may, for example, be designed with the aid of a three-dimensional CAD system.

The term "two-dimensional structures" and the like as used herein refer generally to substantially planar structures that may be considered as respective "layers" that when taken as a whole define or otherwise form the "three-dimensional structures" defined above. While referred to as "two-dimensional structures" it should be understood that each includes an accompanying thickness in a third dimension, albeit such that the structures remain substantially two-dimensional in nature. As a non-limiting example, a plurality of two-dimensional structures would have to be stacked atop one another so as to achieve a thickness comparable to that of the "three-dimensional structures" defined above and described elsewhere herein.

The term "electron beam" as used herein in various embodiments refers to any charged particle beam. The sources of a charged particle beam can include an electron gun, a linear accelerator and so on.

Various embodiments of the invention relate to a method for producing three-dimensional objects by powder additive manufacturing, for instance Electron Beam Melting (EBM) and/or selective laser sintering SLS or selective laser melting SLM. In various example embodiments the object may be wider than the sum of the beam scanning area from the energy beam sources.

Figure 2:
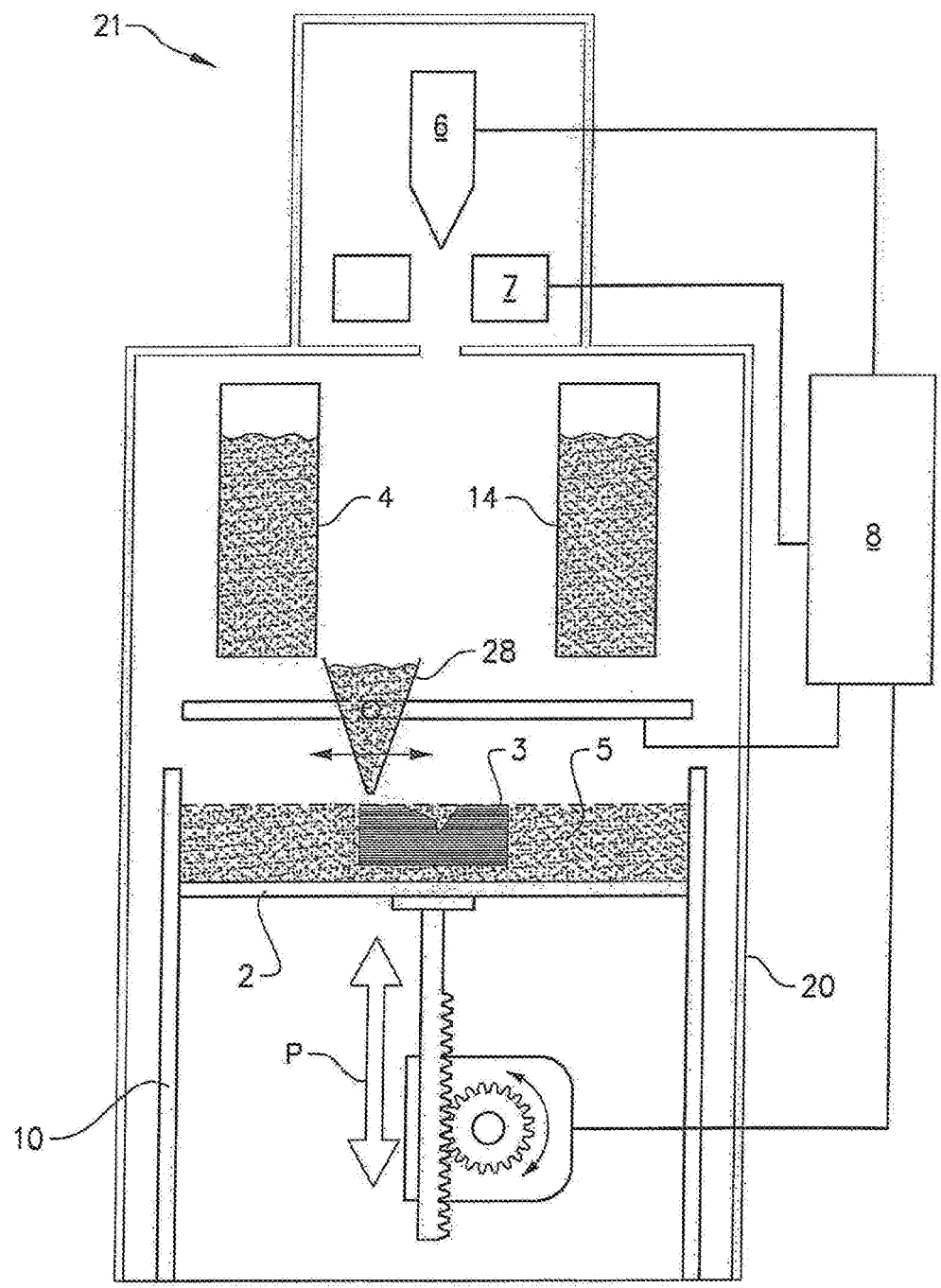

FIG. 2 depicts an embodiment of a freeform fabrication or additive manufacturing apparatus 21 according to prior art.

The apparatus 21 comprises an electron beam gun 6; deflection coils 7; two powder hoppers 4, 14; a build platform 2; a build chamber 10; a powder distributor 28; a powder bed 5; a vacuum chamber 20 and a control unit 8.

The vacuum chamber 20 is capable of maintaining a vacuum environment by means of a vacuum system, which system may comprise a turbomolecular pump, a scroll pump, an ion pump and one or more valves which are well known to a skilled person in the art and therefore need no further explanation in this context. The vacuum system is controlled by the control unit 8.

The electron beam gun 6 is generating an electron beam which is used for melting or fusing together powder material provided on the build platform 2. The control unit 8 may be used for controlling and managing the electron beam emitted from the electron beam gun 6. At least one focusing coil (not shown), at least one deflection coil 7, an optional coil for astigmatic correction (not shown) and an electron beam power supply (not shown) may be electrically connected to the control unit 8. In an example embodiment of the invention the electron beam gun 6 generates a focusable electron beam with an accelerating voltage of about 15-120 kV and with a beam power in the range of 3-10 Kw. The pressure in the vacuum chamber may be $1 \times 10^{-3}$ mbar or lower when building the three-dimensional article 3 by fusing the powder layer by layer with the energy beam.

In another embodiment a laser beam may be used for melting or fusing the powder material. In such case tiltable mirrors may be used in the beam path in order to deflect the laser beam to a predetermined position.

The powder hoppers 4, 14 comprise the powder material to be provided on the build platform 2 in the build chamber 10. The powder material may for instance be pure metals or metal alloys such as titanium, titanium alloys, aluminum, aluminum alloys, stainless steel, Co—Cr alloys, nickel based superalloys, etc., and the like.

The powder distributor 28 is arranged to lay down a thin layer of the powder material on the build platform 2. During a work cycle the build platform 2 will be lowered successively in relation to a fixed point in the vacuum chamber. In order to make this movement possible, the build platform 2 is in one embodiment of the invention arranged movably in vertical direction, i.e., in the direction indicated by arrow P. This means that the build platform 2 starts in an initial position, in which a first powder material layer of necessary thickness has been laid down. Means for lowering the build platform 2 may for instance be through a servo engine equipped with a gear, adjusting screws, etc., and the like An electron beam may be directed over the build platform 2 causing the first powder layer to fuse in selected locations to form a first cross section of the three-dimensional article 3. The beam is directed over the build platform 2 from instructions given by the control unit 8. In the control unit 8 instructions for how to control the electron beam for each layer of the three-dimensional article is stored.

After a first layer is finished, i.e., the fusion of powder material for making a first layer of the three-dimensional article 3, a second powder layer is provided on the build platform 2. The second powder layer is preferably distributed according to the same manner as the previous layer. However, there might be other methods in the same additive manufacturing machine for distributing powder onto the build platform 2.

After having distributed the second powder layer on the build platform, the energy beam is directed over the build platform 2 causing the second powder layer to fuse in selected locations to form a second cross section of the three-dimensional article. Fused portions in the second layer may be bonded to fused portions of the first layer. The fused portions in the first and second layer may be melted together by melting not only the powder in the uppermost layer but also remelting at least a fraction of a thickness of a layer directly below the uppermost layer.

An optional preheating of the powder layer to a temperature below the melting point of the powders may be performed before the actual fusing of the powder takes place at selected areas.

Performing the melting by scanning with a focused beam in the area corresponding to a predetermined cross section of the model stored in the control unit 8.

In another embodiment the build platform 2 may be provided in an enclosable chamber provided with ambient air and atmosphere pressure. In still another example embodiment the work plate may be provided in open air. In those two cases the high energy beam fusing the powder material may be one or a plurality of laser beams.

FIGS. 3A-3D show respective side views of an additive manufacturing machine in different manufacturing stages according to the present invention.

Figure 3A:
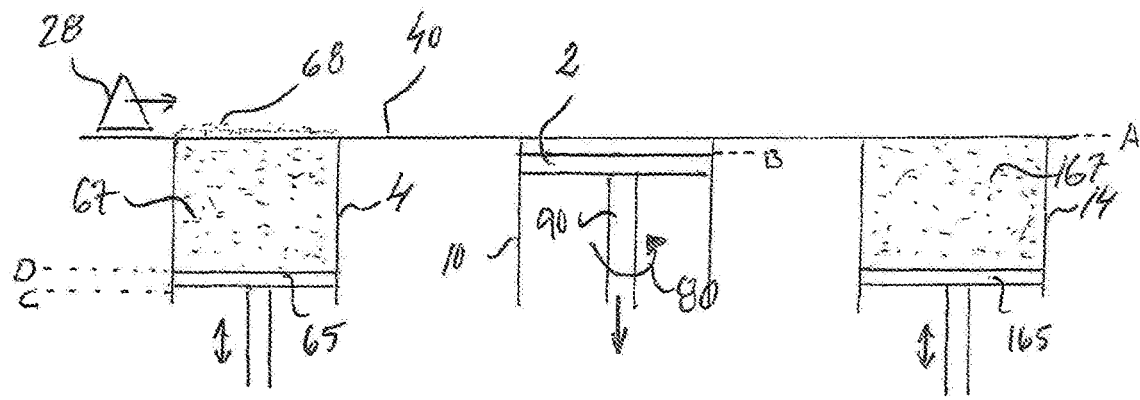

FIG. 3A comprises a first powder hopper 4 with powder 67, a second powder hopper 14 with powder 167, a powder distributor 28, a powder table 40, a build chamber 10, a build platform 2. The energy beam(s) and its energy beam source(s) and beam deflection mechanism for fusing the powder layers have been left out for clarity reasons only.

A predetermined amount of powder 68 from the first powder hopper 4 may be provided on the powder table 40 between the powder distributor 28 and the build chamber 10. This predetermined amount of powder 68 may be provided on the powder table 40 by raising a floor 65 in the powder hopper 4 a predetermined distance. In FIG. 3A the predetermined amount of powder is created by raising the floor 65 from a position C to a position D. The predetermined amount of powder 68 then provided above the top surface A of the powder table 40 in the powder hopper 4, may be raked off by the powder distributor 28 from the powder hopper 4 to the powder table 40. The predetermined amount of powder 68 may be raked off from the first powder hopper 4 to an area between the powder hopper 4 and the build chamber 10, i,e, onto the powder table 40, or directly to the build chamber 10 if there is no space between the build chamber 10 and the first powder hopper 4.

The build platform 2 is arranged at a position denoted by B, which is lower than a position of the powder table 40 which is denoted by A. The difference in height between the powder table 40 and the top surface of the build platform 2 or a previous partly fused powder layer will represent the thickness of the powder layer which is to be fused in selected location according to the model stored in the control unit.

Before a new layer of powder material is applied on top of the build platform 2, the build platform 2 is not only lowered in order to create the space for a new powder layer but also rotated a predetermined angle denoted by arrow 80 in FIG. 3A. The angle of rotation may be between 0°-90° from its original position in a clockwise direction or 0°-90° in a counter clockwise direction. In an example embodiment the angle is 72 degrees either clockwise or counter clockwise. In another example embodiment the angle is 40 degrees either clockwise or counter clockwise. By rotating the build platform 2 a predetermined angle before applying the powder layer instead of always keeping the build platform 2 at a fixed angular position will decrease the likelihood of dimensional instability due to the fact that possible powder distribution errors from one layer may not add up with powder distribution errors in another layer. The powder distribution errors may arise from previously fused areas having a different height compared to the non-fused areas. By changing the angle of the previously built areas with respect to a powder distributor 28 from one layer to another, the likelihood of building up large dimensional errors may be reduced. The build platform is rotated the predetermined angle with respect to the powder distribution mechanism in a clockwise or counter clockwise direction from its original position before the powder application is started. In an example embodiment the rotation of the build platform 2 may be with a first predetermined angle before a first layer is to be applied and a second predetermined angle before a second layer is to be applied. The first and second angles may be different. The first predetermined angle of rotation may be in a clockwise direction and the second predetermined angle of rotation may be in a counter clockwise direction.

In another example embodiment the predetermined angle is randomly selected to be any angle between 0-90 degrees for a predetermined number of layers in either clockwise direction or counter clockwise direction.

The build platform 2 may be rotated by rotating the axis 90 supporting the build platform 2. In another example embodiment the build platform 2 may be rotated by rotating the build tank 10 together with the build platform 2.

Figure 3B:
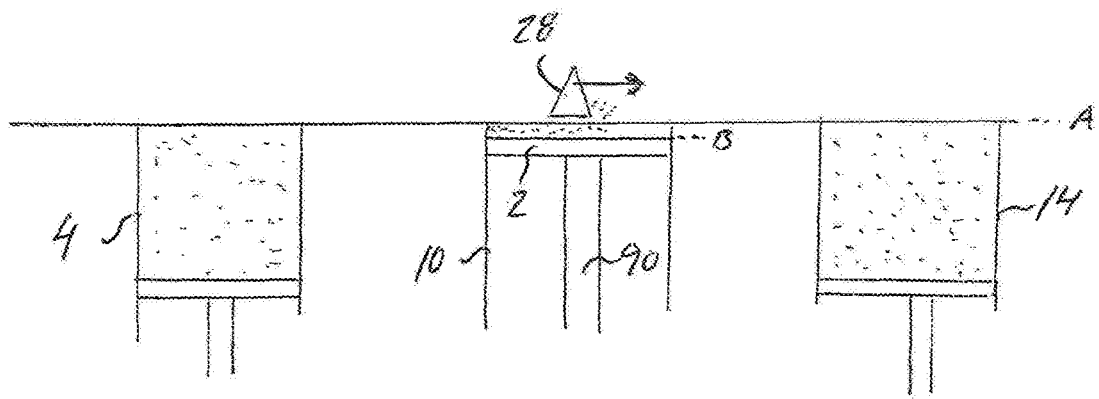

FIG. 3B illustrates the process step in which the powder taken from the powder hopper 4 is distributed over the build platform 2. While distributing the powder material over the build platform 2, the build platform 2 is in a stationary condition, i.e., neither moving downwards nor rotating.

Figure 3C:
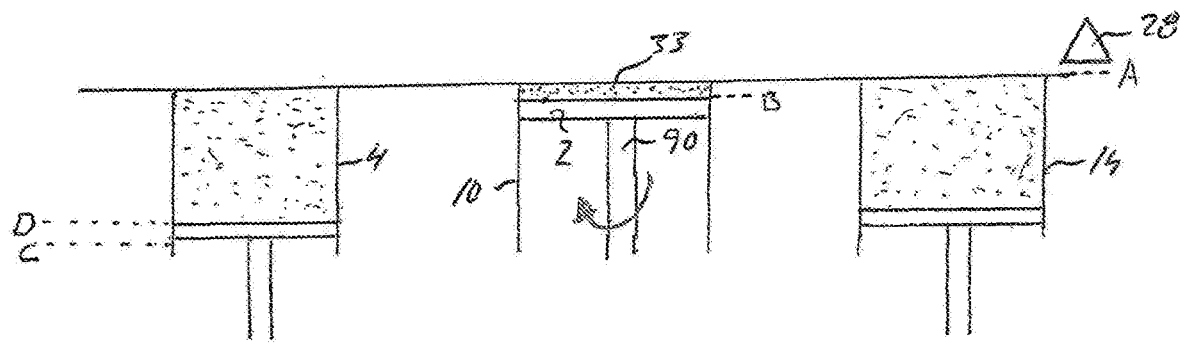

FIG. 3C illustrates a step made after the powder layer has been applied but before the powder layer is irradiated with a high energy beam for fusing the powder in selected locations. In FIG. 3C the build platform 2 is rotated back to its original position by rotating the build platform 2 the predetermined angle in an opposite direction compared to the direction the build platform 2 was rotated prior to applying the powder layer. By the rotation one makes sure that the coordinate system of the high energy beam and the coordinate system of the build platform 2 are aligned to each other. In an example embodiment one or a plurality of alignment marks may be used for returning the build platform 2 to its original position. The alignment marks may be detected by a camera system. The detected alignment marks may either be compared with a reference position or alternatively a first alignment mark may be provided on the build platform 2 and a second alignment mark may be arranged in a fixed position. The fixed alignment mark and the alignment mark on the build platform 2 should be arranged in a predetermined way when the build platform 2 is in its original position. Other means for making sure the build platform 2 is returning to the same position is also possible, such as alignment marks detected by camera or illuminated by laser light are also possible. The alignment marks may be arranged on the backside of the build platform 2. In an alternative embodiment the original position may be validated by detecting an electrical device rotating the build platform 2 or build platform 2 together with the build tank. The electrical device making the rotation may for instance be a step motor having a gear adapted to and engaging with a gear on the build platform 2 or the build tank 10.

Figure 3D:
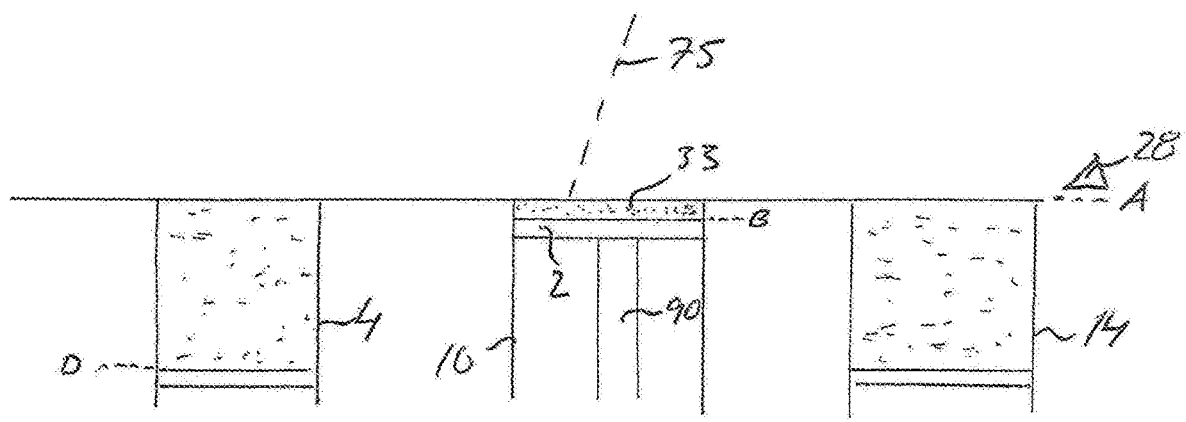

In FIG. 3D the powder layer is radiated in selected locations by the high energy beam 75 for heating and/or melting the powder layer 33. The build platform 2 is stationary in its original position while melting the powder layer at the selected locations. In FIG. 3D only one beam is illustrated, but two or more high energy beams may also be used in the heating and/or melting process. The one or plurality of beams may be of the same type or of different type. Laser beams and/or electron beams may be used for melting and/or heating the powder layer 33.

Figure 3E:
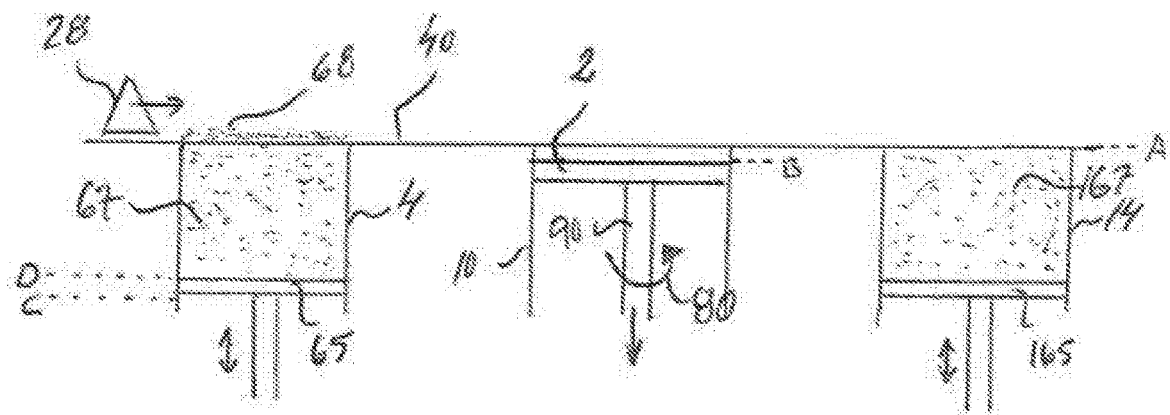
Figure 3F:
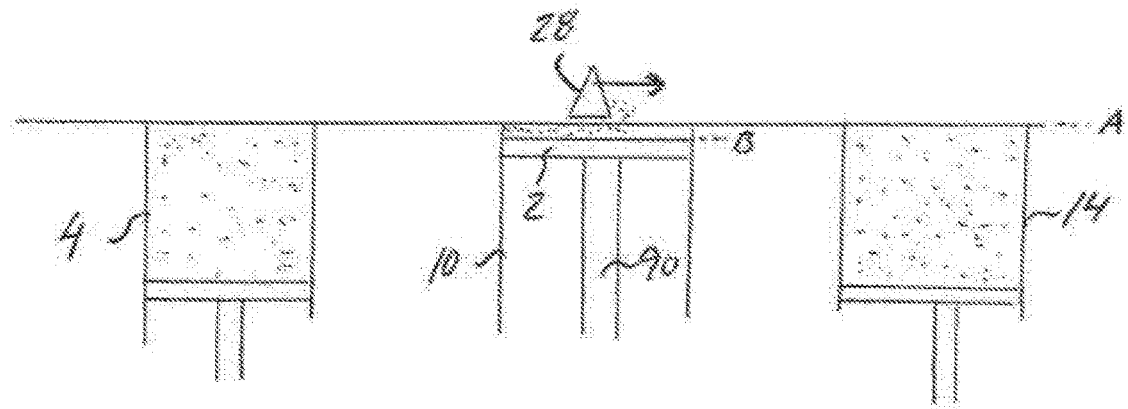
Figure 3G:
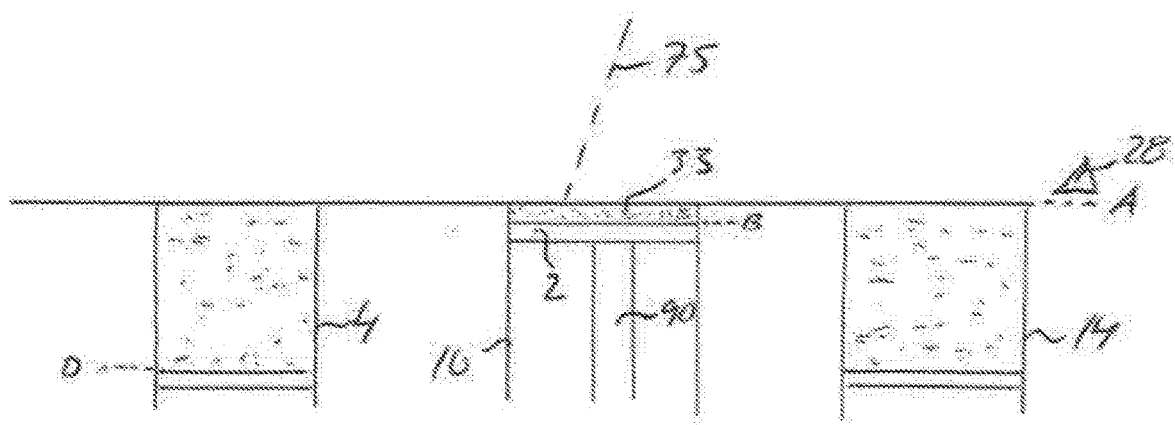

FIGS. 3E-G show respective side views of an additive manufacturing machine in different manufacturing stages according to another embodiment of the present invention.

FIG. 3E comprises a first powder hopper 4 with powder 67, a second powder hopper 14 with powder 167, a powder distributor 28, a powder table 40, a build chamber 10, a build platform 2. The energy beam(s) and its energy beam source(s) and beam deflection mechanism for fusing the powder layers have been left out for clarity reasons only.

A predetermined amount of powder 68 from the first powder hopper 4 may be provided on the powder table 40 between the powder distributor 28 and the build chamber 10. This predetermined amount of powder 68 may be provided on the powder table 40 by raising a floor 65 in the powder hopper 4 a predetermined distance. In FIG. 3E the predetermined amount of powder is created by raising the floor 65 from a position C to a position D. The predetermined amount of powder 68 then provided above the top surface A of the powder table 40 in the powder hopper 4, may be raked off by the powder distributor 28 from the powder hopper 4 to the powder table 40. The predetermined amount of powder 68 may be raked off from the first powder hopper 4 to an area between the powder hopper 4 and the build chamber 10, i,e, onto the powder table 40, or directly to the build chamber 10 if there is no space between the build chamber 10 and the first powder hopper 4.

The build platform 2 is arranged at a position denoted by B, which is lower than a position of the powder table 40 which is denoted by A. The difference in height between the powder table 40 and the top surface of the build platform 2 or a previous partly fused powder layer will represent the thickness of the powder layer which is to be fused in selected location according to the model stored in the control unit.

Before a new layer of powder material is applied on top of the build platform 2, the build platform 2 is not only lowered in order to create the space for a new powder layer but also rotated a predetermined angle denoted by arrow 80 in FIG. 3E. The angle of rotation may be between 0°-90° from its original position in a clockwise direction or 0°-90° in a counter clockwise direction. In an example embodiment the angle is 72 degrees either clockwise or counter clockwise. In another example embodiment the angle is 20 degrees either clockwise or counter clockwise. By rotating the build platform 2 a predetermined angle before applying the powder layer instead of always keeping the build platform 2 at a fixed angular position the likelihood of dimensional instability is decreased due to the fact that possible powder distribution errors from one layer may not add up with powder distribution errors in another layer. The powder distribution errors may arise from previously fused areas having a different height compared to the non-fused areas. By changing the angle of the previously built areas with respect to a powder distributor 28 from one layer to another, the likelihood of building up large dimensional errors may be reduced. The build platform is rotated the predetermined angle with respect to the powder distribution mechanism in a clockwise or counter clockwise direction from its original position before the powder application is started. In an example embodiment the rotation of the build platform 2 may be with a first predetermined angle before a first layer is to be applied and a second predetermined angle before a second layer is to be applied. The first and second angles may be different. The first predetermined angle of rotation may be in a clockwise direction and the second predetermined angle of rotation may be in a counter clockwise direction.

In another example embodiment the predetermined angle is randomly selected to be any angle between 0-90 degrees for a predetermined number of layers in either clockwise direction or counter clockwise direction. The build platform 2 may be rotated by rotating the axis 90 supporting the build platform 2. In another example embodiment the build platform 2 may be rotated by rotating the build tank 10 together with the build platform 2.

FIG. 3F illustrates the process step in which the powder taken from the powder hopper 4 is distributed over the build platform 2. While distributing the powder material over the build platform 2, the build platform 2 is in a stationary condition, i.e., neither moving downwards nor rotating.

In FIG. 3G the powder layer is next radiated in selected locations by the high energy beam 75 for heating and/or melting the powder layer 33. The build platform 2 remains stationary in the same position as in FIG. 3F while melting the powder layer at the selected locations. In FIG. 3G only one beam is illustrated, but two or more high energy beams may also be used in the heating and/or melting process. The one or plurality of beams may be of the same type or of different type. Laser beams and/or electron beams may be used for melting and/or heating the powder layer 33.

Notably, in FIG. 3G, as compared to FIG. 3D, the build platform 2 is not prior (as in FIG. 3C) rotated back to its original position. Instead, in FIG. 3G, the build platform remains in the rotated position achieved in FIG. 3F. Before fusing or radiation that occurs in FIG. 3G, though, the at least one model of the three-dimensional article that is provided (e.g., via a CAD (Computer Aided Design) tool, as described elsewhere herein) may be rotated an angle that corresponds to the predetermined angle by which the build platform 2 (and/or build tank 10) is rotated in FIG. 3F. As a result, only one mechanical rotation of the build platform 2 is needed per layer, with the second mechanical rotation provided in other embodiments described herein being replaced with a computer-generated rotation of the CAD file or model, thus providing a rotation of the coordinate system utilized by the high energy beam during heating and/or melting of the powder layer 33. In other words, by the rotation of the model (without a second rotation of the support surface or build platform 2, one can nevertheless ensure that the coordinate system of the high energy beam and the coordinate system of the build platform 2 are aligned to each other.

Rotation of the CAD file or model may be clockwise or counter-clockwise. The rotation of the CAD file may also be different for different layers, much like the rotation of the build platform 2. It is also possible to rotate the CAD and/or the build platform 2 in clockwise and counter-clockwise directions in the same build of a three-dimensional multi-layer object, provided that the CAD file is always rotated in the same direction as the build platform 2 for any particular layer.

Various embodiments of this invention concern the provision of a rotation of the build platform 2 from its original position prior to applying a new powder layer and then rotating an associated CAD file (i.e., model) in a corresponding manner when the powder layer has been applied but before the powder layer is radiated by the high energy beam for fusing and/or heating at selected locations. In an example embodiment of the present invention the axis of rotation may be vertical and the build platform 2 may be annular.

The build platform 2 may either be rotated by rotating the axis 90 supporting the build platform 2 or rotating the build tank 10 together with the build platform 2 with respect to a powder distribution mechanism. A rotation of the build tank 10 may be applied from its outside.

A position of the build tank 10 and work plate 2 may be measured and feedback to the control unit 8.

It must be understood that the present invention is potentially applicable to any type of layer wise rapid prototyping and additive manufacturing machines, and to other machines using the layer-on-layer fabrication technique, including non-metallic material.

The electron beam source generating an electron beam may be used for melting or fusing together powder material 33 provided on the work plate 2. The control unit 8 may be used for controlling and managing the electron and/or laser beams emitted from at least one electron beam source and/or at least one laser beam source. The electron beams and/or laser beams may be deflected between its first extreme position and its second extreme position.

The powder storage 4, 14 may comprise the metal powder material 67, 167 to be provided on the work plate 2. The metal powder material may for instance be pure metals or metal alloys such as titanium, titanium alloys, aluminum, aluminum alloys, stainless steel, Co—Cr—W alloy, Ni-based alloys, Titanium aluminides, Niobium, silicon nitride, molybdenum disilicide and the like.

Figure 4A:
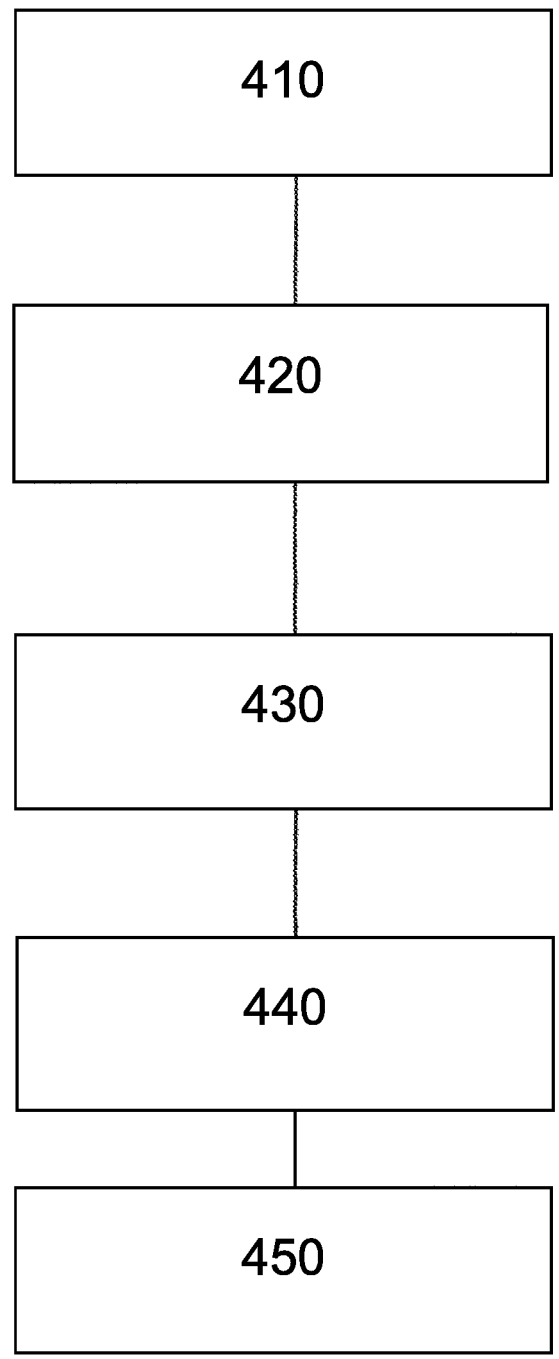

In FIG. 4A it is depicted a flow chart of an example embodiment of a method for forming at least one three-dimensional article through successive fusion of parts of a powder bed on a support structure, which parts correspond to successive portions of the three-dimensional article.

In a first step denoted 410 at least one model of the three-dimensional article is provided. The model may be generated by a CAD (Computer Aided Design) tool. The model may be sliced into a number of slices representing the fused powder layers which is going to form the physical three-dimensional article.

In a second step denoted 420 the support structure is lowered a predetermined distance and rotated a predetermined angle in a first direction before applying a first powder layer covering the lowered and rotated support structure. The rotation may be performed with respect to a powder distribution mechanism. The predetermined angle may be between 0°-90° in a clockwise direction or 0°-90° in a counter clockwise direction. Alternatively the predetermined angle is 0-180 degrees from the original position. When using 0-180 degrees it will take longer time to go to the extreme position 180 and back from the extreme position to the original position compared to if using 0-90 in clockwise direction and 0-90 in counter clockwise direction. Given that the speed of rotation is the same in both case it will be a reduction by a factor 2 in the latter case with clockwise and counter clockwise rotation. The rotation and lowering may be performed simultaneously or as separate steps. In the latter case the rotation of the support structure or the build tank together with the support structure may be performed before lowering or vice versa.

In a third step denoted by 430 the support structure is rotated the predetermined angle in a second direction opposite to the first direction before directing the at least one first energy beam from the at least one first energy beam source at selected locations for fusing the first powder layer. Here the support structure 2 is rotated back to the original position, which position is aligned with the high energy beam coordinate system. By returning back to the original position when fusing the powder material there is no need for coordinate transformation as would be necessary if the fusing position is altered from one layer to another.

In a fourth step denoted by 440 the at least one first energy beam is directed from the at least one first energy beam source at selected locations according to the model for fusing the first powder layer on the support structure, which is stationary, for forming first portions of the three-dimensional article. The at least one first energy beam may be at least one laser beam and/or at least one electron beam.

In a fifth step denoted by 450 step 420 to 440 is repeated until the three-dimensional article is finished.

Figure 4B:
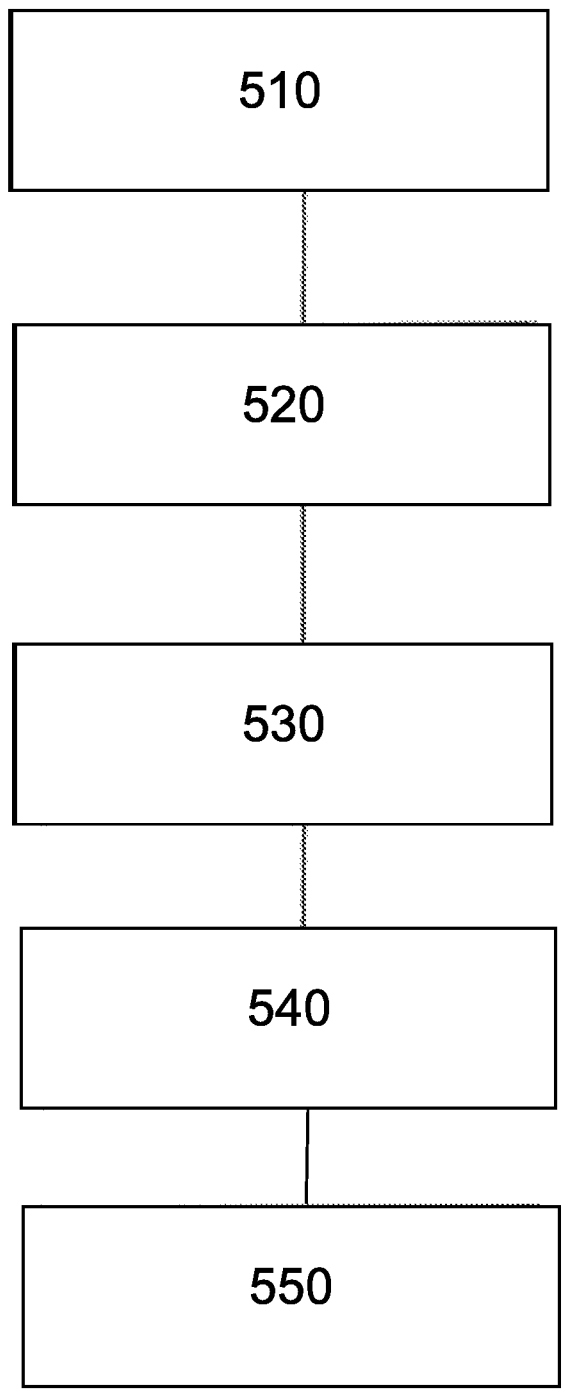

In FIG. 4B it is depicted a flow chart of another example embodiment of a method for forming at least one three-dimensional article through successive fusion of parts of a powder bed on a support structure, which parts correspond to successive portions of the three-dimensional article.

In a first step denoted 510 at least one model of the three-dimensional article is provided. The model may be generated by a CAD (Computer Aided Design) tool. The model may be sliced into a number of slices representing the fused powder layers which is going to form the physical three-dimensional article.

In a second step denoted 520 the support structure is lowered a predetermined distance and rotated a predetermined angle in a first direction before applying a first powder layer covering the lowered and rotated support structure. The rotation may be performed with respect to a powder distribution mechanism. The predetermined angle may be between 0°-90° in a clockwise direction or 0°-90° in a counter clockwise direction. Alternatively the predetermined angle is 0-180 degrees from the original position. When using 0-180 degrees it will take longer time to go to the extreme position 180 and back from the extreme position to the original position compared to if using 0-90 in clockwise direction and 0-90 in counter clockwise direction. Given that the speed of rotation is the same in both case it will be a reduction by a factor 2 in the latter case with clockwise and counter clockwise rotation. The rotation and lowering may be performed simultaneously or as separate steps. In the latter case the rotation of the support structure or the build tank together with the support structure may be performed before lowering or vice versa.

In a third step denoted by 530 the support structure remains in the position obtained during step 520 (i.e., it is not further rotated). Instead, as compared to step 430, during step 530 the at least one model of the three-dimensional article provided in step 510 is electronically rotated. Rotation of the model, as generated by a CAD (Computer Aided Design) tool, is done by an angle corresponding in value and direction to the rotation of the support structure in step 520. In other words, it is also possible to rotate the CAD file (and thus the coordinate system referenced therein) in clockwise and counter-clockwise directions in the same build of a three-dimensional multi-layer object, provided that the CAD file is always rotated in the same direction as the build platform 2 for any particular layer. In at least this embodiment, only one mechanical rotation of the build platform 2 is needed per layer, with the second mechanical rotation provided in other embodiments described herein being replaced with a computer-generated rotation of the CAD file or model, thus providing a rotation of the coordinate system utilized by the high energy beam during heating and/or melting of the powder layer 33 (see step 540).

In a fourth step denoted by 540 the at least one first energy beam is directed from the at least one first energy beam source at selected locations according to the model for fusing the first powder layer on the support structure, which is stationary, for forming first portions of the three-dimensional article. The at least one first energy beam may be at least one laser beam and/or at least one electron beam.

In a fifth step denoted by 550, step 520 to 540 is repeated until the three-dimensional article is finished.

Preheating of the powder with the purpose of heating the powder particles to a predetermined temperature below its melting temperature may be performed at any stage, i.e., during powder application, during rotation and/or lowering of the support structure and/or during fusion of the powder particles but at other regions where fusion is not taking place.

In another aspect of the invention it is provided a program element configured and arranged when executed on a computer to implement a method for forming at least one three-dimensional article through successive fusion of parts of a powder bed, which parts correspond to successive portions of the three-dimensional article. The program element may be installed in a computer readable storage medium. The computer readable storage medium may be the control unit 10 or another and separate control unit, as may be desirable. The computer readable storage medium and the program element, which may comprise computer-readable program code portions embodied therein, may further be contained within a non-transitory computer program product. Further details regarding these features and configurations are provided, in turn, below.

As mentioned, various embodiments of the present invention may be implemented in various ways, including as non-transitory computer program products. A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM)), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (Fe-RAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory VRAM, cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatus, systems, computing devices, computing entities, and/or the like, as have been described elsewhere herein. As such, embodiments of the present invention may take the form of an apparatus, system, computing device, computing entity, and/or the like executing instructions stored on a computer-readable storage medium to perform certain steps or operations. However, embodiments of the present invention may also take the form of an entirely hardware embodiment performing certain steps or operations.

Various embodiments are described below with reference to block diagrams and flowchart illustrations of apparatuses, methods, systems, and computer program products. It should be understood that each block of any of the block diagrams and flowchart illustrations, respectively, may be implemented in part by computer program instructions, e.g., as logical steps or operations executing on a processor in a computing system. These computer program instructions may be loaded onto a computer, such as a special purpose computer or other programmable data processing apparatus to produce a specifically-configured machine, such that the instructions which execute on the computer or other programmable data processing apparatus implement the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the functionality specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide operations for implementing the functions specified in the flowchart block or blocks.

Accordingly, blocks of the block diagrams and flowchart illustrations support various combinations for performing the specified functions, combinations of operations for performing the specified functions and program instructions for performing the specified functions. It should also be understood that each block of the block diagrams and flowchart illustrations, and combinations of blocks in the block diagrams and flowchart illustrations, could be implemented by special purpose hardware-based computer systems that perform the specified functions or operations, or combinations of special purpose hardware and computer instructions.

FIG. 5 is a block diagram of an exemplary system 1020 that can be used in conjunction with various embodiments of the present invention. In at least the illustrated embodiment, the system 1020 may include one or more central computing devices 1110, one or more distributed computing devices 1120, and one or more distributed handheld or mobile devices 1300, all configured in communication with a central server 1200 (or control unit) via one or more networks 1130. While FIG. 5 illustrates the various system entities as separate, standalone entities, the various embodiments are not limited to this particular architecture.

According to various embodiments of the present invention, the one or more networks 1130 may be capable of supporting communication in accordance with any one or more of a number of second-generation (2G), 2.5G, third-generation (3G), and/or fourth-generation (4G) mobile communication protocols, or the like. More particularly, the one or more networks 1130 may be capable of supporting communication in accordance with 2G wireless communication protocols IS-136 (TDMA), GSM, and IS-95 (CDMA). Also, for example, the one or more networks 1130 may be capable of supporting communication in accordance with 2.5G wireless communication protocols GPRS, Enhanced Data GSM Environment (EDGE), or the like. In addition, for example, the one or more networks 1130 may be capable of supporting communication in accordance with 3G wireless communication protocols such as Universal Mobile Telephone System (UMTS) network employing Wideband Code Division Multiple Access (WCDMA) radio access technology. Some narrow-band AMPS (NAMPS), as well as TACS, network(s) may also benefit from embodiments of the present invention, as should dual or higher mode mobile stations (e.g., digital/analog or TDMA/CDMA/analog phones). As yet another example, each of the components of the system 1020 may be configured to communicate with one another in accordance with techniques such as, for example, radio frequency (RF), Bluetooth™, infrared (IrDA), or any of a number of different wired or wireless networking techniques, including a wired or wireless Personal Area Network ("PAN"), Local Area Network ("LAN"), Metropolitan Area Network ("MAN"), Wide Area Network ("WAN"), or the like.

Although the device(s) 1110-1300 are illustrated in FIG. 5 as communicating with one another over the same network 1130, these devices may likewise communicate over multiple, separate networks.

According to one embodiment, in addition to receiving data from the server 1200, the distributed devices 1110, 1120, and/or 1300 may be further configured to collect and transmit data on their own. In various embodiments, the devices 1110, 1120, and/or 1300 may be capable of receiving data via one or more input units or devices, such as a keypad, touchpad, barcode scanner, radio frequency identification (RFID) reader, interface card (e.g., modem, etc.) or receiver. The devices 1110, 1120, and/or 1300 may further be capable of storing data to one or more volatile or non-volatile memory modules, and outputting the data via one or more output units or devices, for example, by displaying data to the user operating the device, or by transmitting data, for example over the one or more networks 1130.

In various embodiments, the server 1200 includes various systems for performing one or more functions in accordance with various embodiments of the present invention, including those more particularly shown and described herein. It should be understood, however, that the server 1200 might include a variety of alternative devices for performing one or more like functions, without departing from the spirit and scope of the present invention. For example, at least a portion of the server 1200, in certain embodiments, may be located on the distributed device(s) 1110, 1120, and/or the handheld or mobile device(s) 1300, as may be desirable for particular applications. As will be described in further detail below, in at least one embodiment, the handheld or mobile device(s) 1300 may contain one or more mobile applications 1330 which may be configured so as to provide a user interface for communication with the server 1200, all as will be likewise described in further detail below.

Figure 6A:
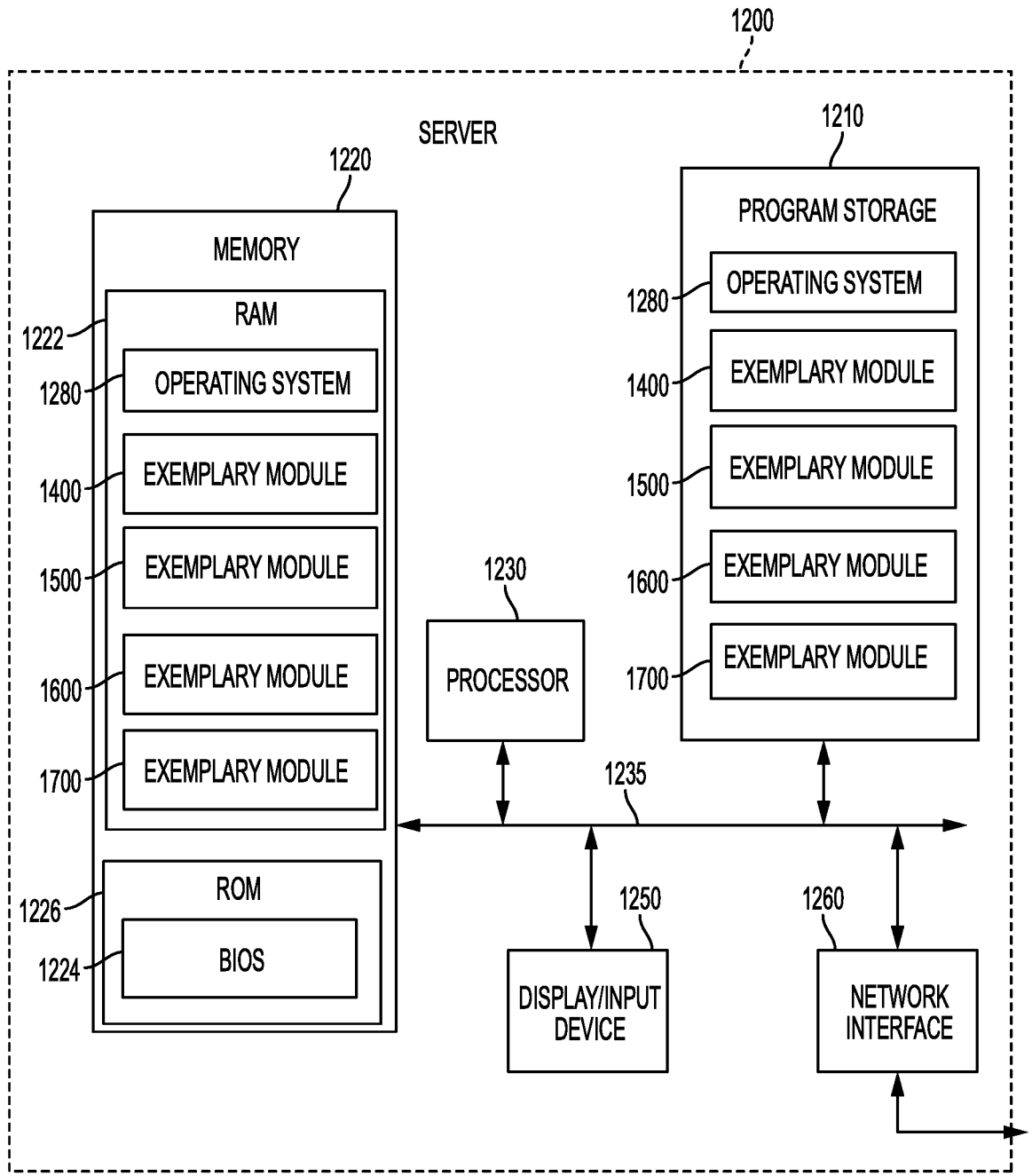
FIG. 6A is a schematic block diagram of a server 1200 according to various embodiments.

FIG. 6A is a schematic diagram of the server 1200 according to various embodiments. The server 1200 includes a processor 1230 that communicates with other elements within the server via a system interface or bus 1235. Also included in the server 1200 is a display/input device 1250 for receiving and displaying data. This display/input device 1250 may be, for example, a keyboard or pointing device that is used in combination with a monitor. The server 1200 further includes memory 1220, which typically includes both read only memory (ROM) 1226 and random access memory (RAM) 1222. The server's ROM 1226 is used to store a basic input/output system 1224 (BIOS), containing the basic routines that help to transfer information between elements within the server 1200. Various ROM and RAM configurations have been previously described herein.

In addition, the server 1200 includes at least one storage device or program storage 210, such as a hard disk drive, a floppy disk drive, a CD Rom drive, or optical disk drive, for storing information on various computer-readable media, such as a hard disk, a removable magnetic disk, or a CD-ROM disk. As will be appreciated by one of ordinary skill in the art, each of these storage devices 1210 are connected to the system bus 1235 by an appropriate interface. The storage devices 1210 and their associated computer-readable media provide nonvolatile storage for a personal computer. As will be appreciated by one of ordinary skill in the art, the computer-readable media described above could be replaced by any other type of computer-readable media known in the art. Such media include, for example, magnetic cassettes, flash memory cards, digital video disks, and Bernoulli cartridges.

Although not shown, according to an embodiment, the storage device 1210 and/or memory of the server 1200 may further provide the functions of a data storage device, which may store historical and/or current delivery data and delivery conditions that may be accessed by the server 1200. In this regard, the storage device 1210 may comprise one or more databases. The term "database" refers to a structured collection of records or data that is stored in a computer system, such as via a relational database, hierarchical database, or network database and as such, should not be construed in a limiting fashion.

A number of program modules (e.g., exemplary modules 1400-1700) comprising, for example, one or more computer-readable program code portions executable by the processor 1230, may be stored by the various storage devices 1210 and within RAM 1222. Such program modules may also include an operating system 1280. In these and other embodiments, the various modules 1400, 1500, 1600, 1700 control certain aspects of the operation of the server 1200 with the assistance of the processor 1230 and operating system 1280. In still other embodiments, it should be understood that one or more additional and/or alternative modules may also be provided, without departing from the scope and nature of the present invention.

In various embodiments, the program modules 1400, 1500, 1600, 1700 are executed by the server 1200 and are configured to generate one or more graphical user interfaces, reports, instructions, and/or notifications/alerts, all accessible and/or transmittable to various users of the system 1020. In certain embodiments, the user interfaces, reports, instructions, and/or notifications/alerts may be accessible via one or more networks 1130, which may include the Internet or other feasible communications network, as previously discussed.

In various embodiments, it should also be understood that one or more of the modules 1400, 1500, 1600, 1700 may be alternatively and/or additionally (e.g., in duplicate) stored locally on one or more of the devices 1110, 1120, and/or 1300 and may be executed by one or more processors of the same. According to various embodiments, the modules 1400, 1500, 1600, 1700 may send data to, receive data from, and utilize data contained in one or more databases, which may be comprised of one or more separate, linked and/or networked databases.

Also located within the server 1200 is a network interface 1260 for interfacing and communicating with other elements of the one or more networks 1130. It will be appreciated by one of ordinary skill in the art that one or more of the server 1200 components may be located geographically remotely from other server components. Furthermore, one or more of the server 1200 components may be combined, and/or additional components performing functions described herein may also be included in the server.

While the foregoing describes a single processor 1230, as one of ordinary skill in the art will recognize, the server 1200 may comprise multiple processors operating in conjunction with one another to perform the functionality described herein. In addition to the memory 1220, the processor 1230 can also be connected to at least one interface or other means for displaying, transmitting and/or receiving data, content or the like. In this regard, the interface(s) can include at least one communication interface or other means for transmitting and/or receiving data, content or the like, as well as at least one user interface that can include a display and/or a user input interface, as will be described in further detail below. The user input interface, in turn, can comprise any of a number of devices allowing the entity to receive data from a user, such as a keypad, a touch display, a joystick or other input device.

Still further, while reference is made to the "server" 1200, as one of ordinary skill in the art will recognize, embodiments of the present invention are not limited to traditionally defined server architectures. Still further, the system of embodiments of the present invention is not limited to a single server, or similar network entity or mainframe computer system. Other similar architectures including one or more network entities operating in conjunction with one another to provide the functionality described herein may likewise be used without departing from the spirit and scope of embodiments of the present invention. For example, a mesh network of two or more personal computers (PCs), similar electronic devices, or handheld portable devices, collaborating with one another to provide the functionality described herein in association with the server 1200 may likewise be used without departing from the spirit and scope of embodiments of the present invention.

According to various embodiments, many individual steps of a process may or may not be carried out utilizing the computer systems and/or servers described herein, and the degree of computer implementation may vary, as may be desirable and/or beneficial for one or more particular applications.

Figure 6B:
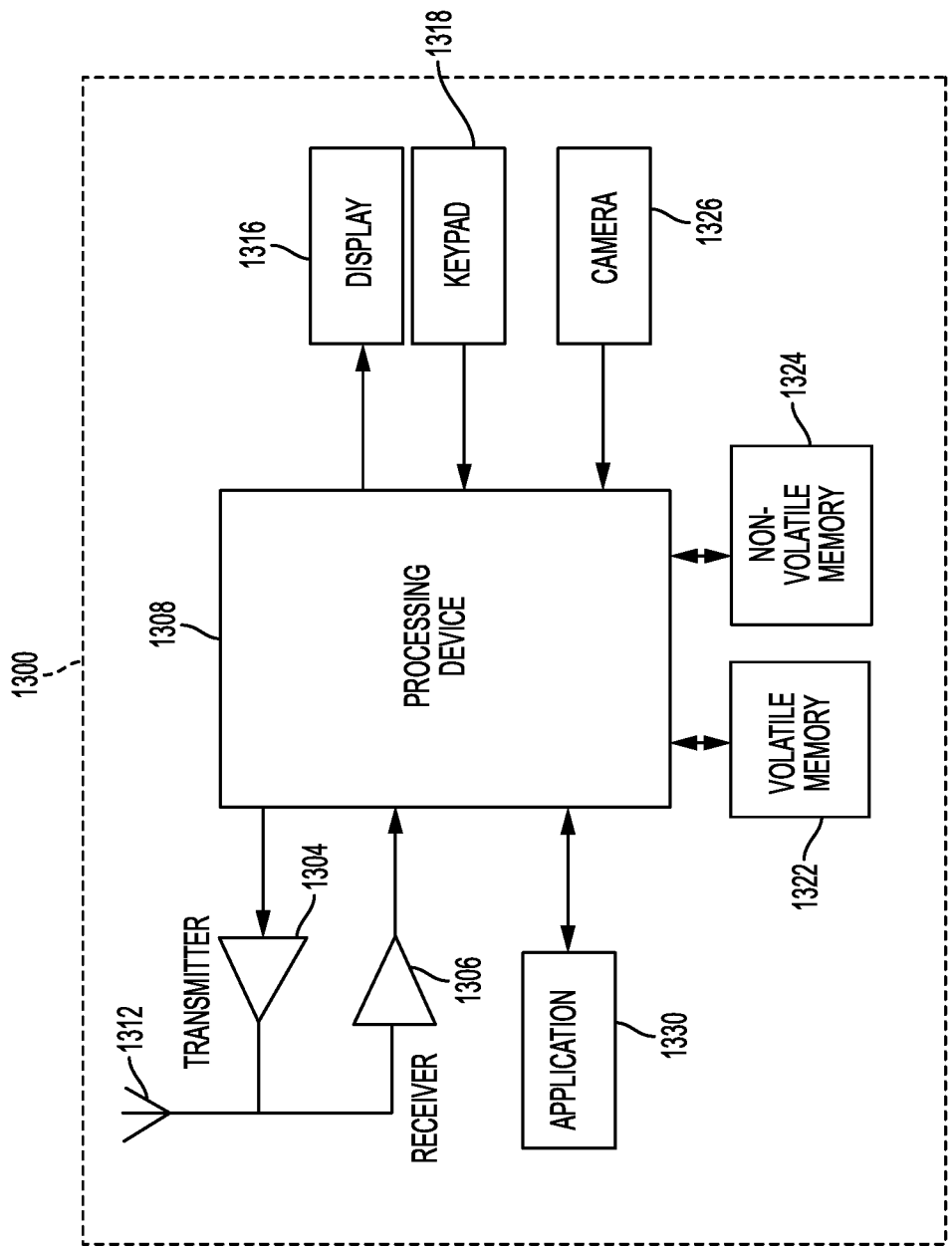
FIG. 6B is a schematic block diagram of an exemplary mobile device 1300 according to various embodiments.

FIG. 6B provides an illustrative schematic representative of a mobile device 1300 that can be used in conjunction with various embodiments of the present invention. Mobile devices 1300 can be operated by various parties. As shown in FIG. 6B, a mobile device 1300 may include an antenna 1312, a transmitter 1304 (e.g., radio), a receiver 1306 (e.g., radio), and a processing element 1308 that provides signals to and receives signals from the transmitter 1304 and receiver 1306, respectively.

The signals provided to and received from the transmitter 1304 and the receiver 1306, respectively, may include signaling data in accordance with an air interface standard of applicable wireless systems to communicate with various entities, such as the server 1200, the distributed devices 1110, 1120, and/or the like. In this regard, the mobile device 1300 may be capable of operating with one or more air interface standards, communication protocols, modulation types, and access types. More particularly, the mobile device 1300 may operate in accordance with any of a number of wireless communication standards and protocols. In a particular embodiment, the mobile device 1300 may operate in accordance with multiple wireless communication standards and protocols, such as GPRS, UMTS, CDMA2000, 1×RTT, WCDMA, TD-SCDMA, LTE, E-UTRAN, EVDO, HSPA, HSDPA, Wi-Fi, WiMAX, UWB, IR protocols, Bluetooth protocols, USB protocols, and/or any other wireless protocol.

Via these communication standards and protocols, the mobile device 1300 may according to various embodiments communicate with various other entities using concepts such as Unstructured Supplementary Service data (US SD), Short Message Service (SMS), Multimedia Messaging Service (MMS), Dual-Tone Multi-Frequency Signaling (DTMF), and/or Subscriber Identity Module Dialer (SIM dialer). The mobile device 1300 can also download changes, add-ons, and updates, for instance, to its firmware, software (e.g., including executable instructions, applications, program modules), and operating system.

According to one embodiment, the mobile device 1300 may include a location determining device and/or functionality. For example, the mobile device 1300 may include a GPS module adapted to acquire, for example, latitude, longitude, altitude, geocode, course, and/or speed data. In one embodiment, the GPS module acquires data, sometimes known as ephemeris data, by identifying the number of satellites in view and the relative positions of those satellites.

The mobile device 1300 may also comprise a user interface (that can include a display 1316 coupled to a processing element 1308) and/or a user input interface (coupled to a processing element 308). The user input interface can comprise any of a number of devices allowing the mobile device 1300 to receive data, such as a keypad 1318 (hard or soft), a touch display, voice or motion interfaces, or other input device. In embodiments including a keypad 1318, the keypad can include (or cause display of) the conventional numeric (0-9) and related keys (#, *), and other keys used for operating the mobile device 1300 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

The mobile device 1300 can also include volatile storage or memory 1322 and/or non-volatile storage or memory 1324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, RRAM, SONOS, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. The volatile and non-volatile storage or memory can store databases, database instances, database mapping systems, data, applications, programs, program modules, scripts, source code, object code, byte code, compiled code, interpreted code, machine code, executable instructions, and/or the like to implement the functions of the mobile device 1300.

The mobile device 1300 may also include one or more of a camera 1326 and a mobile application 1330. The camera 1326 may be configured according to various embodiments as an additional and/or alternative data collection feature, whereby one or more items may be read, stored, and/or transmitted by the mobile device 1300 via the camera. The mobile application 1330 may further provide a feature via which various tasks may be performed with the mobile device 1300. Various configurations may be provided, as may be desirable for one or more users of the mobile device 1300 and the system 1020 as a whole.

It will be appreciated that many variations of the above systems and methods are possible, and that deviation from the above embodiments are possible, but yet within the scope of the claims. Many modifications and other embodiments of the invention set forth herein will come to mind to one skilled in the art to which these inventions pertain having the benefit of the teachings presented in the foregoing descriptions and the associated drawings. Such modifications may, for example, involve using a different numbers of energy beam sources than the exemplified two energy beam sources. There may be a mixture between different kinds of energy beam sources such as laser beam sources and electron beam sources. In various example embodiments only a plurality of laser beam sources are used. Other electrically conductive materials than pure metallic powder may be used such as electrically conductive powders of polymers and electrically conductive powder of ceramics. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. An apparatus for forming a three-dimensional article through successive fusion of parts of a powder bed, which parts corresponds to successive cross sections of the three-dimensional article, the apparatus comprising:
   a selectively rotatable support structure;
   at least one first energy beam;
   at least one control unit with a computer model of the three-dimensional article stored thereon, the control unit being configured for:
      moving the support structure a predetermined distance in z-direction and rotating the support structure a predetermined angle in a first direction before applying a first powder layer covering the lowered and rotated support structure,
      rotating the support structure the predetermined angle in a second direction opposite to the first direction before directing the at least one first energy beam from at least one first energy beam source at selected locations for fusing the first powder layer,
      directing the at least one first energy beam from the at least one first energy beam source at the selected locations according to the model for fusing the first powder layer on the support structure, which is stationary, for forming first portions of the three-dimensional article, and
      repeating the moving, rotating, and directing steps until the three-dimensional article is finished.

2. The apparatus according to claim 1, wherein the powder layer is provided by a powder distributor, which powder distributor is pushing a predetermined amount of powder to be applied in front of the powder distributor over and above the support structure.

3. The apparatus according to claim 1, wherein the support structure is a horizontal plate.

4. The apparatus according to claim 1, wherein the at least one first energy beam is at least one laser beam and/or at least one electron beam.

5. The apparatus according to claim 1, wherein the control unit is further configured for preheating the first powder layer before fusing the first powder layer.

6. The apparatus according to claim 5, wherein the control unit is configured for preheating performed by using the at least one first energy beam source also used for fusing the powder layer.

* * * * *